United States Patent
Nagano

(10) Patent No.: US 10,421,309 B2
(45) Date of Patent: Sep. 24, 2019

(54) DISPLAY, ARTICLE, ORIGINAL PLATE, AND METHOD FOR PRODUCING ORIGINAL PLATE

(71) Applicant: TOPPAN PRINTING CO., LTD., Taito-ku, Tokyo (JP)

(72) Inventor: Akira Nagano, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/796,606

(22) Filed: Oct. 27, 2017

(65) Prior Publication Data

US 2018/0056701 A1   Mar. 1, 2018

Related U.S. Application Data

(63) Continuation of application No. PCT/JP2016/063406, filed on Apr. 28, 2016.

(30) Foreign Application Priority Data

Apr. 30, 2015  (JP) .................................. 2015-093428

(51) Int. Cl.
*B42D 25/324* (2014.01)
*B42D 25/328* (2014.01)
(Continued)

(52) U.S. Cl.
CPC .......... *B42D 25/328* (2014.10); *B42D 25/324* (2014.10); *B42D 25/41* (2014.10);
(Continued)

(58) Field of Classification Search
CPC ............................ B42D 25/324; B42D 25/328
See application file for complete search history.

(56) References Cited

U.S. PATENT DOCUMENTS

| 5,058,992 A | 10/1991 | Takahashi |
| 2014/0104686 A1 | 4/2014 | Yuasa et al. |

(Continued)

FOREIGN PATENT DOCUMENTS

| JP | 2011-123186 | 6/2011 |
| JP | 2011123186 A * | 6/2011 |

(Continued)

OTHER PUBLICATIONS

JP-2011123186-A Translation (Year: 2011).*

(Continued)

*Primary Examiner* — Kyle R Grabowski
(74) *Attorney, Agent, or Firm* — Squire Patton Boggs (US) LLP

(57) ABSTRACT

The distance between the first reflection surfaces and the third reflection surface in the thickness direction of a substrate is a distance that is able the obverse surface of the reflection layer to emit light of a first color by interference between light reflected from the first reflection surfaces and light reflected from the third reflection surface. The distance between the second reflection surfaces and the third reflection surface in the thickness direction of the substrate is a distance that is able the obverse surface to emit light of a second color by interference between light reflected from the second reflection surfaces and light reflected from the third reflection surface. The obverse surface emits light of a third color that includes the light of the first color and the light of the second color.

11 Claims, 12 Drawing Sheets

(51) Int. Cl.
- *G02B 5/18* (2006.01)
- *G09F 19/12* (2006.01)
- *G02B 5/02* (2006.01)
- *B44F 1/02* (2006.01)
- *B44F 1/08* (2006.01)
- *B42D 25/41* (2014.01)
- *B42D 25/45* (2014.01)
- *B42D 25/455* (2014.01)

(52) U.S. Cl.
CPC ........... *B42D 25/45* (2014.10); *B42D 25/455* (2014.10); *B44F 1/02* (2013.01); *B44F 1/08* (2013.01); *G02B 5/0294* (2013.01); *G02B 5/18* (2013.01); *G02B 5/1861* (2013.01); *G09F 19/12* (2013.01)

(56) References Cited

U.S. PATENT DOCUMENTS

| | | | |
|---|---|---|---|
| 2015/0192897 A1* | 7/2015 | Schilling | B42D 25/351 359/2 |
| 2015/0352884 A1 | 12/2015 | Fuhse et al. | |

FOREIGN PATENT DOCUMENTS

| | | | |
|---|---|---|---|
| JP | 4983899 | 7/2012 | |
| JP | 2013-193268 | 9/2013 | |
| JP | 2014-134739 | 7/2014 | |
| WO | WO 2012/176429 | 12/2012 | |
| WO | WO 2014/001283 | 1/2014 | |
| WO | WO-2014001283 A1 * | 1/2014 | ............. B42D 25/21 |
| WO | WO 2014/117938 A1 | 8/2014 | |

OTHER PUBLICATIONS

International Search Report dated Jun. 7, 2016, in International Patent Application No. PCT/JP2016/063406, 2 pages.

International Preliminary Report on Patentability dated Oct. 31, 2017, in International Patent Application No. PCT/JP2016/063406, 8 pages.

Extended European Search Report dated Nov. 14, 2018, in European Patent Application No. 16786576.5, 8 pages.

* cited by examiner

DISPLAY, ARTICLE, ORIGINAL PLATE, AND METHOD FOR PRODUCING ORIGINAL PLATE

BACKGROUND

The present disclosure relates to a display that may be used as a structure for preventing counterfeiting, an article including a display, an original plate for producing a display, and a method for producing an original plate.

Securities, such as banknotes, gift certificates, and checks, cards, such as credit cards, bank cards, and ID cards, and identity documents, such as passports and driver's licenses, have display bodies affixed to prevent counterfeiting of these articles by providing visual effects different from those of printed articles formed by dyes or pigments.

A known display that provides visual effects different from those of printed articles has a plurality of relief diffraction gratings. The relief diffraction gratings differ from one another in the extending direction of grooves or the grating constant, allowing the display to display an iridescent image (see U.S. Pat. No. 5,058,992, for example).

Such display bodies are widely used to prevent counterfeiting of articles, so the techniques used for the display bodies are widely known. Accordingly, the possibility of counterfeiting of the display bodies has been increased, resulting in the need for display bodies that are more effective in preventing counterfeiting than the display bodies that display iridescent images.

In recent years, for the purpose of preventing counterfeiting more effectively, a display has been proposed that provides visual effects that differ from those of display bodies having relief diffraction gratings. The proposed display includes an uneven structure, which is formed by a plurality of first surfaces and a second surface. The display emits light of a mixed color produced by a plurality of wavelengths of light (see Japanese Patent No. 4983899, for example).

With the display described above, the color of light emitted by the display is uniquely determined by the distance between the first surfaces and the second surface. That is, the variety of the colors of the image displayed by the display is limited by the distance between the first surfaces and the second surface that is possible in the display. For this reason, there is a need for display bodies that can display images with a wider variety of colors.

SUMMARY

It is an objective of the present disclosure to provide a display, an article, an original plate for producing a display, and a method for producing an original plate that display an image with a wider variety of colors.

To achieve the foregoing objective, a display is provided that includes a substrate including a covered surface and a reflection layer covering at least part of the covered surface. An obverse surface of the reflection layer includes a plurality of first reflection surfaces, a plurality of second reflection surfaces, and a third reflection surface. In a plan view facing the obverse surface of the reflection layer, the first reflection surfaces and the second reflection surfaces are rectangular surfaces, which are substantially square in shape, and the third reflection surface occupies gaps between adjacent ones of the rectangular surfaces. A distance between the first reflection surfaces and the third reflection surface in a thickness direction of the substrate is a distance that is able the obverse surface of the reflection layer to emit light of a first color by interference between light reflected from the first reflection surfaces and light reflected from the third reflection surface. A distance between the second reflection surfaces and the third reflection surface in the thickness direction of the substrate is a distance that is able the obverse surface of the reflection layer to emit light of a second color, which differs from the first color, by interference between light reflected from the second reflection surfaces and light reflected from the third reflection surface. The obverse surface of the reflection layer emits light of a third color that includes the light of the first color and the light of the second color.

To achieve the foregoing objective, an article is provided that includes a display and a support portion that supports the display. The display is the above described display.

To achieve the foregoing objective, an original plate for producing a display is provided that includes a covered surface, which includes a plurality of first covered surfaces, a plurality of second covered surfaces, and a third covered surface, and a reflection layer, which covers the covered surface. The original plate includes a substrate including a surface and a resist layer that is located on the surface of the substrate and includes a transfer surface, which is opposite to a surface that is in contact with the substrate. The transfer surface includes a plurality of first transfer surfaces for forming the first covered surfaces, a plurality of second transfer surfaces for forming the second covered surfaces, and a third transfer surface for forming the third covered surface. In a plan view facing the transfer surface, the first transfer surfaces and the second transfer surfaces are rectangular transfer surfaces, which are substantially square in shape, and the third transfer surface occupies gaps between adjacent ones of the rectangular transfer surfaces. A distance between the first transfer surfaces and the third transfer surface in a thickness direction of the substrate is set to an extent that is able an obverse surface of the reflection layer to emit light of a first color by interference between light reflected from sections of the obverse surface of the reflection layer that are located on the first covered surfaces and light reflected from a section of the obverse surface of the reflection layer that is located on the third covered surface. A distance between the second transfer surfaces and the third transfer surface in the thickness direction of the substrate is set to an extent that is able the obverse surface of the reflection layer to emit light of a second color, which differs from the first color, by interference between light reflected from sections of the obverse surface of the reflection layer that are located on the second covered surfaces and light reflected from the section of the obverse surface of the reflection layer that is located on the third covered surface. The transfer surface is configured so as to allow the obverse surface of the reflection layer to emit light of a third color that includes the light of the first color and the light of the second color.

To achieve the foregoing objective, a method for producing an original plate is provided. The original plate is used to produce a display including a covered surface, which includes a plurality of first covered surfaces, a plurality of second covered surfaces, and a third covered surface, and a reflection layer, which covers the covered surface. The method includes: forming a resist layer on a surface of a substrate; exposing the resist layer to light; and developing the exposed resist layer to form a transfer surface in the resist layer. The exposing includes exposing the resist layer such that: the transfer surface after developing includes a plurality of first transfer surfaces for forming the first covered surfaces, a plurality of second transfer surfaces for forming the second covered surfaces, and a third transfer surface for forming the third covered surface, wherein, in a plan view facing the transfer surface, the first transfer surfaces and the second transfer surfaces are rectangular transfer surfaces, which are substantially square in shape, and the third transfer surface occupies gaps between adjacent ones of the rectangular transfer surfaces; a distance between the first transfer surfaces and the third transfer surface in a thickness direction of the substrate is set to an extent that is able an obverse surface of the reflection layer to emit light of a first color by interference between light reflected from sections of the obverse surface of the reflection layer that are located on the first covered surfaces and light reflected from a section of the obverse surface of the reflection layer that is located on the third covered surface; a distance between the second transfer surfaces and the third transfer surface in the thickness direction of the substrate is set to an extent that is able the obverse surface of the reflection layer to emit light of a second color, which differs from the first color, by interference between light reflected from sections of the obverse surface of the reflection layer that are located on the second covered surfaces and light reflected from the section of the obverse surface of the reflection layer that is located on the third covered surface; and the transfer surface is configured so as to allow the obverse surface of the reflection layer to emit light of a third color that includes the light of the first color and the light of the second color.

With the above-described configuration, when white light enter on the display, the reflection light from the first reflection surfaces differs from the light reflected from the third reflection surface in optical path length, which is the value obtained by multiplying the geometric distance by the refractive index. The interference of light according to the difference in optical path lengths causes light beams of a certain wavelength to cancel each other. Accordingly, the light emitted from the region including first reflection surfaces and the third reflection surface is not white light and has the first color. The light of the first color has wavelengths that are determined by the distance between the first reflection surfaces and the third reflection surface.

In addition, the reflection light from the second reflection surfaces also differs from the light reflected from the third reflection surface in optical path length. The interference of light according to the difference in optical path lengths in the display causes light beams of a certain wavelength to cancel each other. Since the distance between the second reflection surfaces and the third reflection surface differs from the distance between the first reflection surfaces and the third reflection surface, the light emitted from the region including the second reflection surfaces and the third reflection surface differs from the light emitted from the region including the first reflection surfaces and the third reflection surface in wavelength and has the second color that differs from the color of the light emitted from the region including the first reflection surfaces and the third reflection surface.

The display emits light of the third color, which includes the first color and the second color. The third color of light is a color produced by additive mixing of two colors and therefore has a lower chroma than the first color and the second color. This allows the display to produce a color that cannot be displayed by a structure having only the first reflection surfaces and the third reflection surface, or a structure having only the second reflection surfaces and the third reflection surface, enabling the display to display an image with a wider variety of colors.

DESCRIPTION OF EXEMPLARY EMBODIMENTS

First Embodiment

Referring to FIGS. 1 to 15, a first embodiment of a display, an article, an original plate, and a method for producing an original plate according to the present disclosure is now described. In the following descriptions, the structure of the display, the operation of the display, the structure of the article, a method for producing the display, and a method for producing an original plate are described in this order.

[Structure of Display]

Referring to FIGS. 1 to 4, structure of the display is now described. For purpose of illustration, reflection layer of the display is not shown in FIG. 1.

Figure 1:
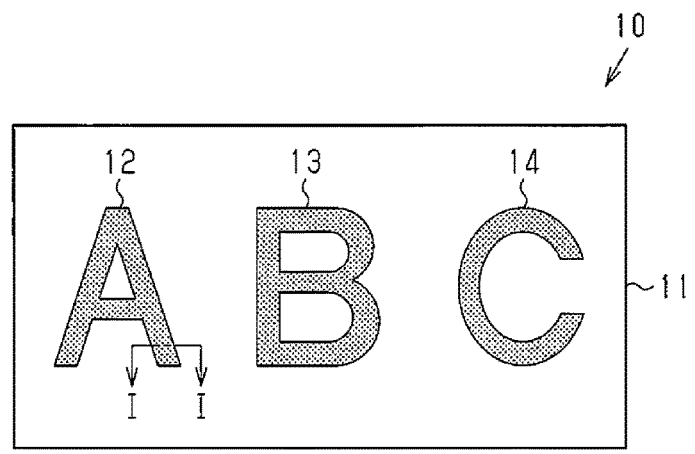
FIG. 1 is a plan view showing the planar structure of a display of a first embodiment according to the present disclosure.

As shown in FIG. 1, a display 10 includes a planar substrate 11. A first display region 12, a second display region 13, and a third display region 14 are defined in the display 10. Each display region includes a plurality of display portions. The first display region 12 displays letter A, the second display region 13 displays letter B, and the third display region 14 displays letter C. The display 10 displays character string ABC formed by the first display region 12, the second display region 13, and the third display region 14.

The display 10 may include two or less display regions or four or more display regions. The display regions may display images other than characters, such as numbers, symbols, and pictures.

Figure 2:
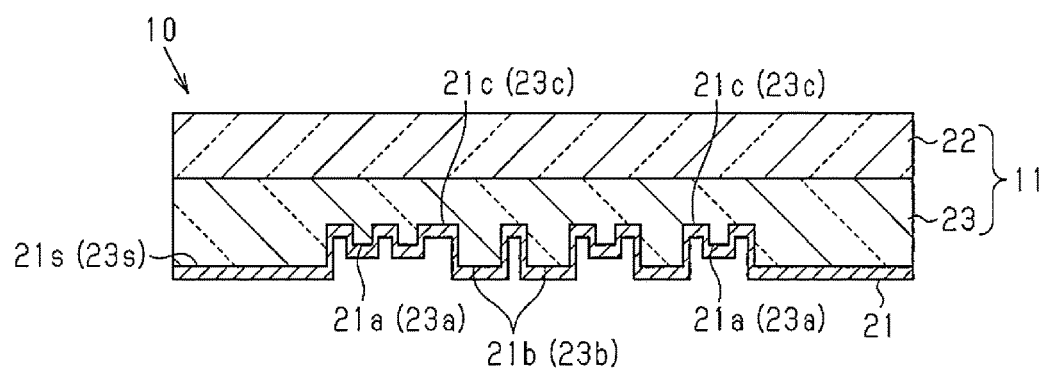
FIG. 2 is a cross-sectional view taken along line I-I in FIG. 1, showing a part of the cross-sectional structure of the display.

FIG. 2 shows cross-sectional structure of a part of the first display region 12 taken along line I-I in FIG. 1. The second display region 13 and the third display region 14 differ from the first display region 12 in the position in the display 10, but the their structure for emitting colored light are similar to the first display region 12 in. Accordingly, the structure of the first display region 12 is described in detail below, but structures of the second and third display regions 13 and 14 are not described.

As shown in FIG. 2, the display 10 includes a light transmissive substrate 11 and a reflection layer 21. The substrate 11 includes a support layer 22 and an relief layer 23. The relief layer 23 has a covered surface 23s, which is an uneven surface and opposite to the support layer 22. Although the substrate 11 of the present embodiment includes the support layer 22 and the relief layer 23, the substrate 11 may include one layer having the covered surface 23s.

The covered surface 23s includes a plurality of first covered surfaces 23a, a plurality of second covered surfaces 23b, and a third covered surface 23c. In the thickness direction of the substrate 11, the position of the first covered surfaces 23a differs from the position of the second covered surfaces 23b, and the position of the third covered surface 23c differs from the positions of the first covered surfaces 23a and the second covered surfaces 23b.

Although the reflection layer 21 of the present embodiment covers the entire covered surface 23s, it is sufficient that the reflection layer 21 cover the first covered surfaces 23a, the second covered surfaces 23b, and the third covered surface 23c, which form at least part of the covered surface 23s. The surface of the reflection layer 21 that is in contact with the covered surface 23s of the relief layer 23 is a reflection surface 21s, which is an example of the obverse surface of the reflection layer 21. In the present embodiment, light enter from the side on the support layer 22 of the display 10. Thus, the surface of the reflection layer 21 that is in contact with the covered surface 23s of the substrate 11 is the reflection surface 21s, which reflects the light incident on the display 10.

The reflection layer 21 increases reflection efficiency for the light incident on the display 10, allowing the display 10 to emit light of higher intensity than a display that does not include a reflection layer. The reflection layer 21 increases visibility of the display 10 accordingly.

Light may enter on the reflection layer 21 from the side opposite to the substrate 11 with respect to the reflection layer 21. In this case, the surface of the reflection layer 21 that is opposite to the surface in contact with the covered surface 23s serves as the reflection surface.

The reflection surface 21s includes a plurality of first reflection surfaces 21a, a plurality of second reflection surfaces 21b, and a third reflection surface 21c. In the thickness direction of the substrate 11, position of the first reflection surfaces 21a differs from the position of the second reflection surfaces 21b, and position of the third reflection surface 21c differs from positions of the first reflection surfaces 21a and the second reflection surfaces 21b. Each first reflection surface 21a is identical to the other first reflection surfaces 21a in position, and each second reflection surface 21b is identical to the other second reflection surfaces 21b in position. The first to third reflection surfaces 21a, 21b, and 21c are flat surfaces. The first reflection surfaces 21a are substantially parallel to the third reflection surface 21c, and the second reflection surfaces 21b are substantially parallel to the third reflection surface 21c.

That is, the sections of the reflection surface 21s that are in contact with the first covered surfaces 23a are the first reflection surfaces 21a, the sections that are in contact with the second covered surfaces 23b are the second reflection surface 21b, and the section that is in contact with the third covered surface 23c is the third reflection surface 21c.

Thickness of the reflection layer 21 in the thickness direction of the substrate 11 is between 30 nm and 150 nm inclusive, for example. In the reflection layer 21, the sections corresponding to the first reflection surfaces 21a, the sections corresponding to the second reflection surfaces 21b, and the section corresponding to the third reflection surface 21c have same thickness.

Figure 3:
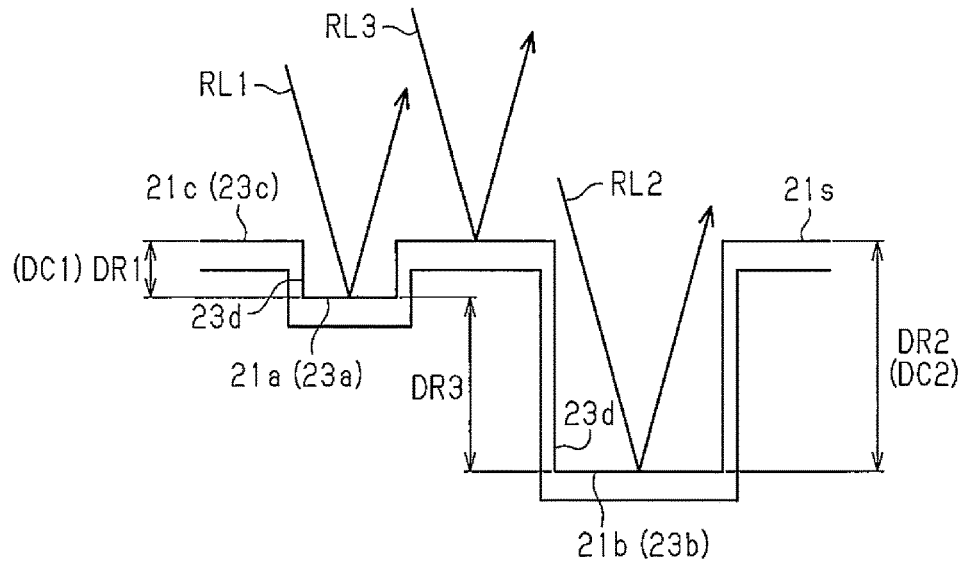
FIG. 3 is an enlarged cross-sectional view showing a part of the cross-sectional structure of the display.

Referring to FIG. 3, distance between the first reflection surfaces 21a and the third reflection surface 21c in the thickness direction of the substrate 11 is referred to as a first inter-reflection-surface distance DR1. The first inter-reflection-surface distance DR1 is a distance that is able the reflection surface 21s to emit light of a first color by the interference between first reflection light RL1 reflected from the first reflection surfaces 21a and third reflection light RL3 reflected from the third reflection surface 21c.

In the thickness direction of the substrate 11, the distance between the second reflection surfaces 21b and the third reflection surface 21c is referred to as a second inter-reflection-surface distance DR2, which is greater than the first inter-reflection-surface distance DR1. The second inter-reflection-surface distance DR2 is a distance that is able the reflection surface 21s to emit light of a second color, which differs from the first color, by the interference between second reflection light RL2 reflected from the second reflection surfaces 21b and the third reflection light RL3 reflected from the third reflection surface 21c.

When white light enter on the reflection surface 21s, the first reflection light RL1 reflected from the first reflection surfaces 21a differs from the third reflection light RL3 reflected from the third reflection surface 21c in optical path length, which is the value obtained by multiplying geometric distance by refractive index. The interference of light according to the difference in optical path lengths reduces diffraction efficiency of the diffracted light of a certain wavelength at the reflection surface 21s, whereas diffraction efficiency of the light of the other wavelengths is not reduced. The reflection surface 21s thus emits light of a specific color, that is, the color determined by the first inter-reflection-surface distance DR1.

In addition, the second reflection light RL2 reflected from the second reflection surfaces 21b differs from the third reflection light RL3 reflected from the third reflection surface 21c in optical path length, in a similar manner as the first reflection light RL1 and the third reflection light RL3. This allows the reflection surface 21s to emit light having a color that is determined by the second inter-reflection-surface distance DR2 and differs from the color specific to the first inter-reflection-surface distance DR1.

Accordingly, the reflection surface 21s emits light that has a third color and includes light of first color which is produced by the first reflection light RL1 and the third reflection light RL3, and light of second color which is produced by the second reflection light RL2 and the third reflection light RL3. The display 10 thus produces a color that cannot be displayed by a structure having only the first reflection surfaces 21a and the third reflection surface 21c, or a structure having only the second reflection surfaces 21b and the third reflection surface 21c. The display 10 is capable of displaying an image with a wider variety of colors.

The reflection surface 21s is preferably structured as follows in order to emit light of the first color and light of the second color. The distance between the first covered surfaces 23a, which are in contact with the first reflection surfaces 21a, and the third covered surface 23c, which is in contact with the third reflection surface 21c, is referred to as a first inter-covered-surface distance DC1, and the distance between the second covered surfaces 23b, which are in contact with the second reflection surfaces 21b, and the third covered surface 23c, which is in contact with the third reflection surface 21c, is referred to as a second inter-covered-surface distance DC2. The first inter-covered-surface distance DC1 and the second inter-covered-surface distance DC2 are preferably between 0.05 μm and 0.5 μm inclusive, more preferably between 0.15 μm and 0.4 μm inclusive.

When the first inter-covered-surface distance DC1 and the second inter-covered-surface distance DC2 are greater than or equal to 0.05 μm, intensity of light in visible wavelength range is reduced, allowing the reflection surface 21s to emit light of a color having a higher chroma than white. When the first inter-covered-surface distance DC1 and the second inter-covered-surface distance DC2 are greater than or equal to 0.05 μm, external factors in manufacturing of the display 10, such as condition of the manufacturing apparatus, a change in manufacturing environment of the display 10, and a change in composition of material of the display 10, are less likely to affect the optical properties of the display 10. Further, the first inter-covered-surface distance DC1 and the second inter-covered-surface distance DC2 that are less than or equal to 0.5 μm allow the covered surface 23s to be formed with a higher accuracy in shape and dimensions than a structure in which the first inter-covered-surface distance DC1 and the second inter-covered-surface distance DC2 are greater.

In structure in which light enter on the reflection layer 21 from side opposite to the substrate 11 with respect to the reflection layer 21, the surface of the reflection layer 21 that is opposite to the surface in contact with the relief layer 23 serves as the reflection layer. Thus, assuming that the sections of the reflection layer 21 corresponding to the first reflection surfaces 21a, the sections corresponding to the second reflection surfaces 21b, and the section corresponding to the third reflection surface 21c are equal in thickness, the first inter-reflection-surface distance DR1 and the second inter-reflection-surface distance DR2 is able the reflection surface to emit light of the colors determined by these distances when the first inter-covered-surface distance DC1 and the second inter-covered-surface distance DC2 are within the ranges described above.

The sections of the reflection layer 21 corresponding to the first reflection surfaces 21a, the sections corresponding to the second reflection surfaces 21b, and the section corresponding to the third reflection surface 21c may differ from one another in thickness as long as the first inter-reflection-surface distance DR1 is within the range described above for the first inter-covered-surface distance DC1 and the second inter-reflection-surface distance DR2 is within the range described above for the second inter-covered-surface distance DC2.

A third inter-reflection-surface distance DR3, which is the distance between the first reflection surfaces 21a and the second reflection surfaces 21b in the thickness direction of the substrate 11, may be between 0.02 μm and 0.1 μm inclusive. When the third inter-reflection-surface distance DR3 is within this range, the hue of the first color does not differ significantly from the hue of the second color. Mixing of the first color and the second color capable the reflection surface 21s to emit light having the third color, which is an halftone color different from the first color and the second color.

The third color, which is an halftone color of two colors, is more difficult to correctly reproduce than the first color and the second color. Accordingly, when the display 10 is attached to an article to prevent counterfeiting of the article, the display 10 and thus the article including the display 10 are difficult to counterfeit.

The third inter-reflection-surface distance DR3 may be between 0.2 μm and 0.45 μm inclusive. When the third inter-reflection-surface distance DR3 is within this range, the hue of the first color differs significantly from the hue of the second color. This will result in the third color being a mixed color of two colors having different hues. Such an halftone color is more complex than the first color and the second color.

The side surfaces 23d connecting the first covered surfaces 23a to the third covered surface 23c and the side surfaces 23d connecting the second covered surfaces 23b to the third covered surface 23c are substantially perpendicular to the third covered surface 23c. However, the side surfaces 23d may be inclined with respect to the direction normal to the third covered surface 23c. Nevertheless, the angle formed by the side surfaces 23d and the third covered surface 23c is preferably closer to a right angle. The angle between the side surfaces 23d and the third covered surface 23c that is closer to the right angle increases the chroma of color of light emitted by the reflection surface 21s.

The sections of the reflection layer 21 covering the side surfaces 23d have a thickness in direction perpendicular to the thickness direction of the substrate 11. The thickness is less than thickness of the sections of the reflection layer 21 corresponding to the first reflection surfaces 21a, the second reflection surfaces 21*b*, and the third reflection surface 21*c* in the thickness direction of the substrate 11.

Figure 4:
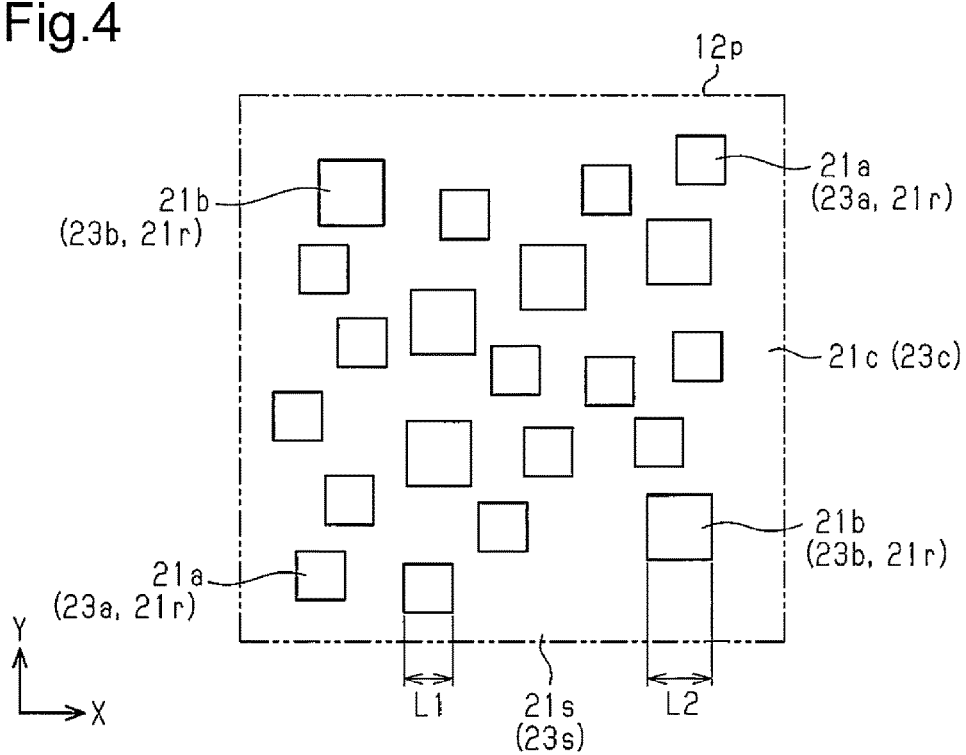
FIG. 4 is a plan view showing the planar structure of a display portion as viewed facing the reflection surface.

FIG. 4 is an enlarged view showing one of the display portions 12*p* forming the first display region 12. The display portion is a part of the first display region 12. The display portion 12*p* shown in FIG. 4 is square in shape, but the display portion 12*p* may have other shape, such as the shape of a rectangle, a triangle, a circle, or an ellipse. One display portion 12*p* is dimensioned such that the light of the first color and the light of the second color produced by the display portion 12*p* are mixed and emitted as the light of the third color. When the display portion 12*p* has a polygonal shape, the length of one side of the outer edge of the display portion 12*p* is preferably less than or equal to 300 μm. Each display portion 12*p* serves as one pixel with which the first display region 12 displays one image. FIG. 4 shows the planar structure in a plan view facing the reflection surface 21*s*.

Referring to FIG. 4, in a plan view facing the reflection surface 21*s*, the first reflection surfaces 21*a* and the second reflection surfaces 21*b* are rectangular surfaces 21*r*, which are substantially square in shape. The third reflection surface 21*c* occupies gaps between adjacent ones of the rectangular surfaces 21*r*. Each rectangular surface 21*r* is separated from the other rectangular surfaces 21*r*.

The display portion 12*p* is defined by the sides extending in X direction which is one direction, and the sides extending in Y direction which is perpendicular to the X direction. In the display portion 12*p*, the rectangular surfaces 21*r* are arranged in the X direction in a random manner and arranged in the Y direction in a random manner. Thus, the distances between adjacent ones of the rectangular surfaces 21*r* in the X direction vary irregularly with respect to the order of arrangement of the rectangular surfaces 21*r*. Further, the distances between adjacent ones of the rectangular surfaces 21*r* in the Y direction vary irregularly with respect to the order of arrangement of the rectangular surfaces 21*r*.

Of the plurality of rectangular surfaces 21*r*, the first reflection surfaces 21*a* are arranged in the X direction in a random manner and arranged in the Y direction in a random manner. In addition, of the plurality of rectangular surfaces 21*r*, the second reflection surfaces 21*b* are arranged in the X direction in a random manner and arranged in the Y direction in a random manner.

Since the rectangular surfaces 21*r* are arranged in a random manner in the reflection surface 21*s*, the reflection surface 21*s* is likely to emit light isotropically. This enlarges the region in which the light emitted from the reflection surface 21*s* is perceived, as compared to a structure that emits light in limited directions. Nevertheless, the observer of the display 10 may not perceive the light reflected from the reflection surface 21*s* depending on the angle formed by the viewing direction of the observer and the direction in which the light is emitted from the reflection surface 21*s*.

In the display portion 12*p*, each second reflection surface 21*b* is adjacent to at least one of the first reflection surfaces 21*a*, while some first reflection surfaces 21*a* are not adjacent to any of the second reflection surfaces 21*b*. That is, most of the region defined by display portion 12*p* is a mixed region in which first reflection surfaces 21*a* and second reflection surfaces 21*b* are both present.

Such a structure is advantageous in that the light of the first color and the light of the second color are emitted from the mixed region and therefore mixed at high resolution, as compared to a structure in which the display portion 12*p* is divided into a first region where first reflection surfaces 21*a* are located and a second region where second reflection surfaces 21*b* are located so that a first reflection surface 21*a* is adjacent to a second reflection surface 21*b* only at boundary between the first region and the second region.

In a plan view facing the reflection surface 21*s*, a first length L1, which is length of one side of each first reflection surface 21*a*, is smaller than a second length L2, which is the length of one side of each second reflection surface 21*b*. When the first length L1 differs from the second length L2, the area occupied by the reflection surfaces and the position of each reflection surface can be set more freely.

In a plan view facing the reflection surface 21*s*, the length of one side of each rectangular surface 21*r* is preferably between 0.3 μm and 2 μm inclusive. When the rectangular surfaces 21*r* having such dimensions are arranged in the display portion 12*p*, the distances between adjacent rectangular surfaces 21*r* may be between 0.3 μm and 2 μm inclusive, for example.

When length of one side of each rectangular surface 21*r* and distances between rectangular surfaces 21*r* are between 0.3 μm and 2 μm inclusive, emission angle of the diffracted light is greater than that in a structure in which the length of one side of each rectangular surface 21*r* and the distances between rectangular surface 21*r* are greater. This enlarges the region in which the colored light that consists of a plurality of light beams can be observed.

In a plan view facing the reflection surface 21*s*, the first length L1 of one side of each first reflection surface 21*a* of the display portion 12*p* is preferably about same as the first length L1 of one side of the other first reflection surfaces 21*a*. That is, each first reflection surface 21*a* is preferably substantially identical to the other first reflection surfaces 21*a* in area.

In a plan view facing the reflection surface 21*s*, the second length L2 of one side of each second reflection surface 21*b* is preferably about same as the second length L2 of one side of the other second reflection surfaces 21*b*. That is, each second reflection surface 21*b* is preferably substantially identical to the other second reflection surfaces 21*b* in area.

When length of one side of each rectangular surface 21*r* is between 0.3 μm and 2 μm inclusive as described above, the rectangular surfaces 21*r* are extremely minute. Such a rectangular surface 21*r* is difficult to form as compared to a rectangular surface 21*r* having a longer side. To form each rectangular surface 21*r* with high accuracy, each first reflection surface 21*a* is preferably substantially identical to the other first reflection surfaces 21*a* in shape and area. For same reason, each second reflection surface 21*b* is preferably substantially identical to the other second reflection surfaces 21*b* in shape and area.

In a plan view facing the reflection surface 21*s* of the display portion 12*p*, the sum of the area of the third reflection surface 21*c*, the areas of all the first reflection surfaces 21*a*, and the areas of all the second reflection surfaces 21*b* is the total area S of display portion 12*p*. In the display portion 12*p*, the area occupied by all the first reflection surfaces 21*a* is referred to as a first unit area S1, the area occupied by all the second reflection surfaces 21*b* is referred to as a second unit area S2, and the area occupied by all the rectangular surfaces 21*r* is referred to as a third unit area S3.

In the display portion 12*p*, the percentage of the third unit area S3 to the total area S is referred to as a rectangular surface ratio. The rectangular surface ratio is preferably between 15% and 50% inclusive.

The rectangular surfaces 21*r* in the display portion 12*p* are substantially square in shape, and each rectangular surface 21*r* is arranged separate from the other rectangular surfaces 21r. Therefore, the rectangular surface ratio is 50% at maximum. A higher rectangular surface ratio in the display portion 12p increases the intensity of light emitted from the display portion 12p and is therefore desirable in order to brighten the image displayed by the first display region 12. When the rectangular surface ratio is greater than or equal to 15%, intensity of light emitted from the display portion 12p is high enough for the observer to perceive the image displayed by the first display region 12.

That is, in order for the display portion 12p to emit light of the third color and to emit such light in a sufficient intensity, the rectangular surface ratio of the display portion 12p is preferably between 15% and 50% inclusive.

Further, percentage of the first unit area S1 to the third unit area S3 is referred to as a first reflection surface ratio. The first reflection surface ratio is preferably greater than or equal to 70% and less than 100%. This results in the percentage of the first unit area S1 to the third unit area S3 being greater than or equal to 70%, allowing the intensity of the light of the first color to be predominant in the light emitted by the display 10. As such, the first color is predominant in the color of the image displayed by the display 10, and the second color acts as an additional color that modifies the first color. This allows for adjustment of the chroma of color of the image displayed by the display 10 without significantly changing the hue of the color of the image from the hue of the first color.

[Operation of Display]

Referring to FIGS. 5 to 11, operation of the display 10 is now described. Before description of the operation of the display 10, relationship among grating constant of diffraction grating, which is the pitch of the grooves in the diffraction grating, wavelengths of illumination light, incident angle of illumination light, and emission angle of diffracted light is described.

[Diffraction Grating]

When diffraction grating is illuminated with illumination light from a light source, diffraction grating emits strong diffracted light in a specific direction according to the traveling direction and the wavelength of the illumination light, which is the incident light.

The emission angle β of mth-order diffracted light (m=0, ±1, ±2, . . . ) is calculated from Equation (1) below when the light travels in a plane that is perpendicular to the extending direction of grooves of diffraction grating.

$$d = \frac{m\lambda}{\sin\alpha - \sin\beta} \quad (1)$$

In Equation (1), d is grating constant of diffraction grating, m is diffraction order, and λ is wavelength of incident light and diffracted light. Further, a is emission angle of zeroth-order diffracted light, which is regular reflection light. The absolute value of a is equal to the incident angle of the illumination light. When the diffraction grating is a reflective diffraction grating, the incident direction of the illumination light and the emission direction of the regular reflection light are symmetrical with respect to the direction normal to the surface including the diffraction grating.

When the diffraction grating is a reflective diffraction grating, the angle α is greater than or equal to 0° and less than 90° inclusive. Further, when the illumination light is inclined with respect to the surface including the diffraction grating and two angular ranges bounded by the angle of the direction normal to the surface, which is 0°, are set, the angle β is a positive value if the emission direction of the diffracted light and the emission direction of the regular reflection light are within same angular range, and the angle β is a negative value if the emission direction of the diffracted light and the incident direction of the illumination light are within same angular range.

Figure 5:
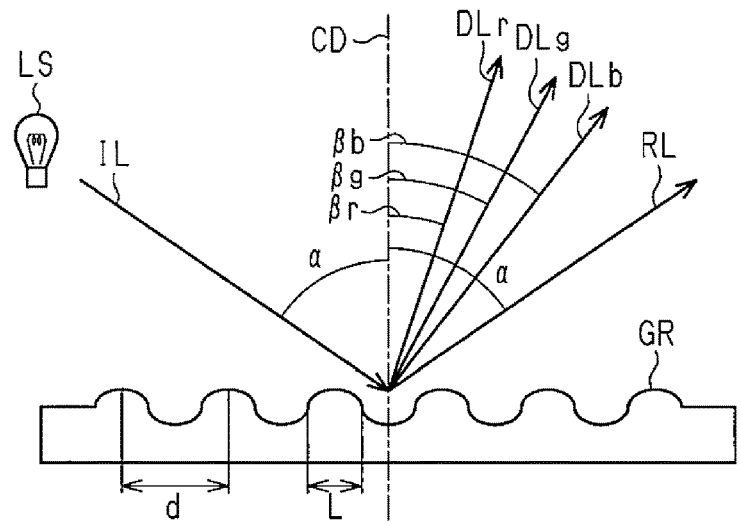
FIG. 5 is a schematic view of the state in which a diffraction grating having a relatively small grating constant emits positive first-order diffracted light.
Figure 6:
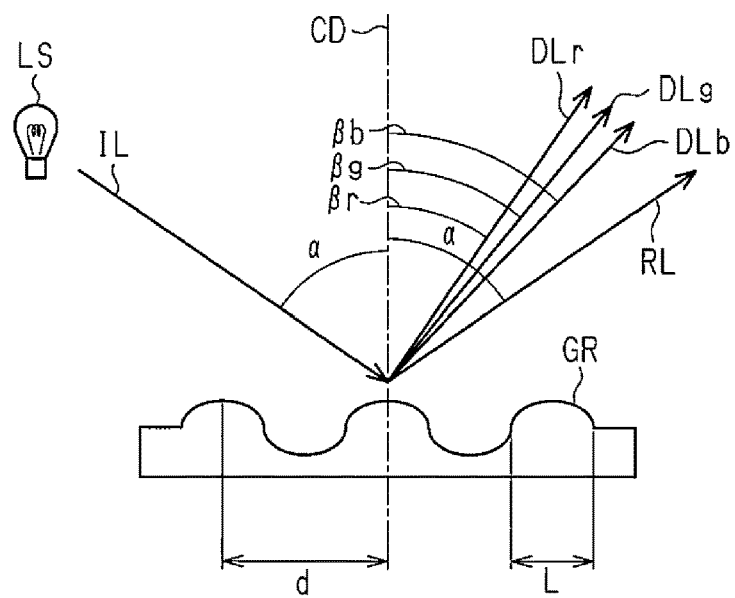
FIG. 6 is a schematic view of the state in which a diffraction grating having a relatively large grating constant emits positive first-order diffracted light.

FIG. 5 schematically shows the state in which a diffraction grating having a relatively small grating constant emits first-order diffracted light. FIG. 6 schematically shows the state in which a diffraction grating having a relatively large grating constant emits first-order diffracted light.

As shown in FIGS. 5 and 6, a point light source LS emits white illumination light IL. The illumination light IL contains a red light component, which has wavelengths in the red wavelength region, a green light component, which has wavelengths in the green wavelength region, and a blue light component, which has wavelengths in the blue wavelength region. The green light component, the blue light component, and the red light component emitted by the point light source LS enter on a diffraction grating GR at an incident angle α with respect to the normal direction CD. The diffraction grating GR emits part of the green light component as diffracted light DLg at an emission angle βg, emits part of the blue light component as diffracted light DLb at an emission angle βb, and emits part of the red light component as diffracted light DLr at an emission angle βr.

As clearly shown by the comparison between the emission angles β shown in FIG. 5 and the emission angles β shown in FIG. 6, the diffraction grating GR having a greater grating constant d emits diffracted light beams in directions closer to the direction in which the regular reflection light RL is emitted. In addition, the greater grating constant d of the diffraction grating GR, the smaller differences among the emission angle βg, the emission angle βb, and the emission angle βr.

For purpose of illustration, of the diffracted light beams emitted by the diffraction grating GR, the diffracted light beams of the other orders that are obtained by Equation (1) are not shown in FIGS. 5 and 6.

Under specific illumination conditions, the diffraction grating GR emits diffracted light beams at different emission angles depending on wavelengths of diffracted light. When the light source is a white light source, such as sun or a fluorescent lamp, the diffraction grating GR emits light of different wavelengths at different emission angles. Thus, the image displayed by the diffraction grating GR is iridescent and changes its color in response to change in the observation angle of the observer of the diffraction grating GR, which is the viewing direction of the observer relative to the surface including the diffraction grating GR.

With reference to Equation (2), the relationship among grating constant of diffraction grating, wavelength of illumination light, and intensity of diffracted light in an emission direction of diffracted light, i.e., diffraction efficiency, is now described.

According to Equation (1), when illumination light enter at an incident angle α on a diffraction grating GR of a grating constant d, diffraction grating emits diffracted light at an emission angle β. The diffraction efficiency of the light of a wavelength λ varies depending on factors such as the grating constant of the diffraction grating and depth of grooves. The diffraction efficiency may be obtained by Equation (2) below.

$$\eta = \left(\frac{2}{\pi}\right)^2 \times \sin^2\left(\frac{2\pi}{\lambda} \times \frac{r}{\cos\theta}\right) \times \sin^2\left(\frac{\pi}{d} \times L\right) \quad (2)$$

In Equation (2), η is the diffraction efficiency (η is a value between 0 and 1 inclusive), r is the depth of grooves in the diffraction grating, L is the width of the grooves in the diffraction grating, d is the grating constant, θ is the incident angle of the illumination light, and λ is the wavelength of the illumination light and the diffracted light. Equation (2) holds true for the diffraction grating that has the shape of a rectangular wave in a cross-section taken in a plane perpendicular to the longitudinal direction of the grooves and in which grooves have a relatively small depth.

As is evident from Equation (2), the diffraction efficiency η varies depending on the depth r of grooves, the grating constant d, the incident angle θ, and the wavelength λ. In addition, the diffraction efficiency η tends to decrease gradually as the diffraction order m increases.

[Display]

Figure 7:
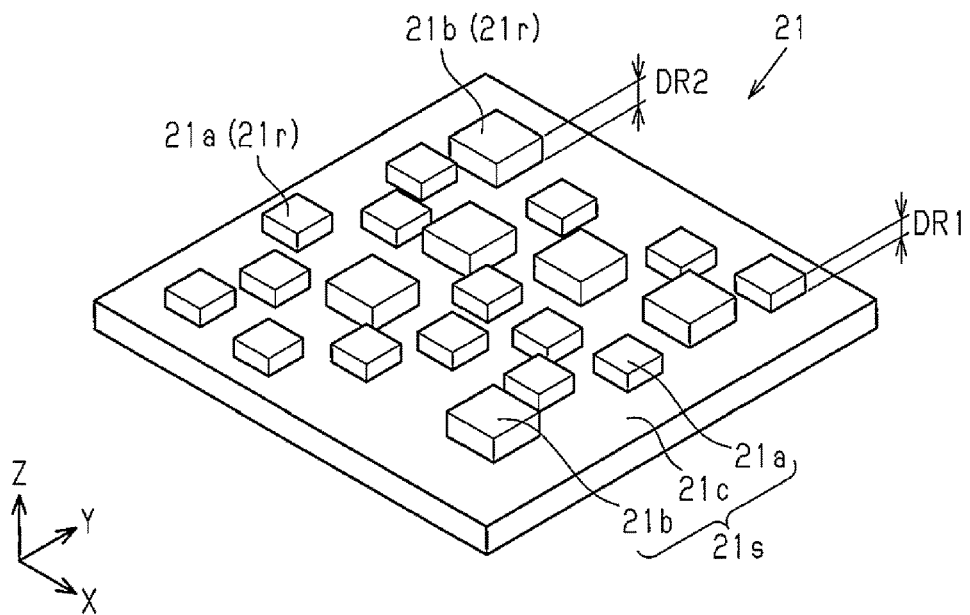
FIG. 7 is a perspective view showing the structure of a structural body corresponding to the reflection layer of a display portion.

Referring to FIGS. 7 to 11, optical characteristics of the display 10 is now described. FIG. 7 is a perspective view showing an example of a display portion 12p including a plurality of first reflection surfaces 21a, a plurality of second reflection surfaces 21b, and a third reflection surface 21c.

Figure 10:
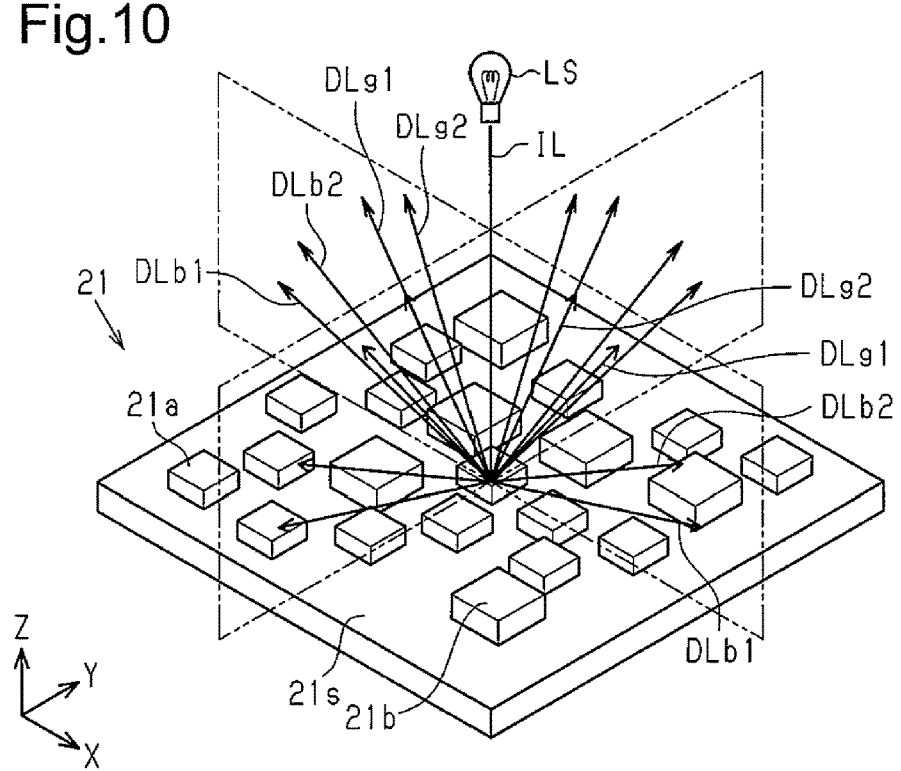
FIG. 10 is a diagram for illustrating the operation of the display portion.

In FIGS. 7 and 10, for purpose of illustration, the reflection layer 21 is shown as a structure formed by a plurality of first protrusions, each having a first reflection surface 21a as a top surface, a plurality of second protrusions, each having a second reflection surface 21b as a top surface, and a layer including the third reflection surface 21c as one surface on which the first protrusions and the second protrusions are located.

Figure 8:
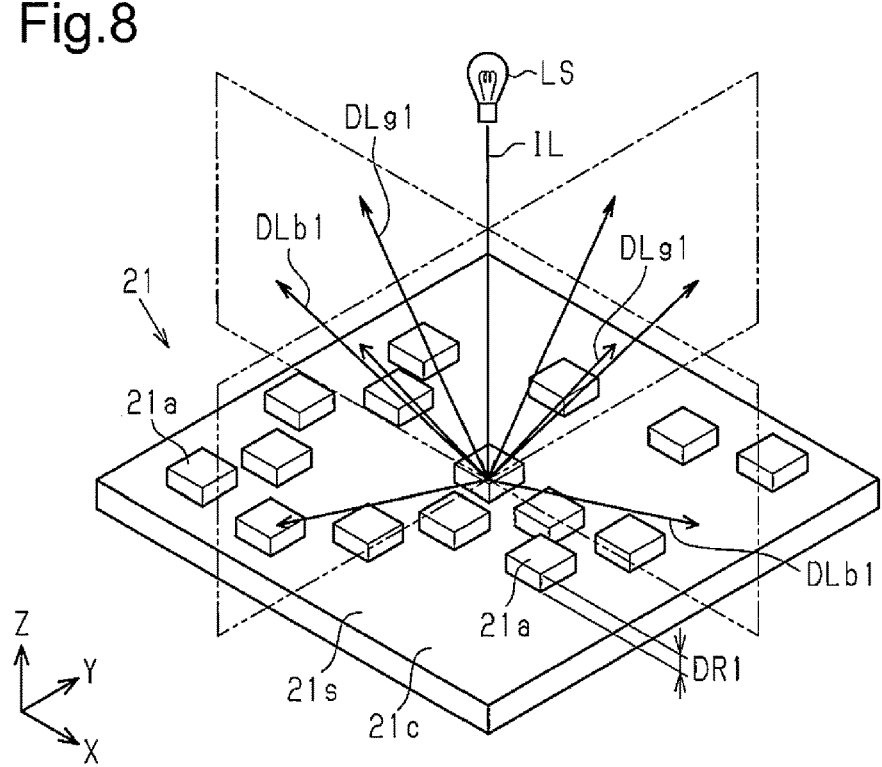
FIG. 8 is a diagram for illustrating the operation of the first reflection surfaces and the third reflection surface of the display portion.
Figure 9:
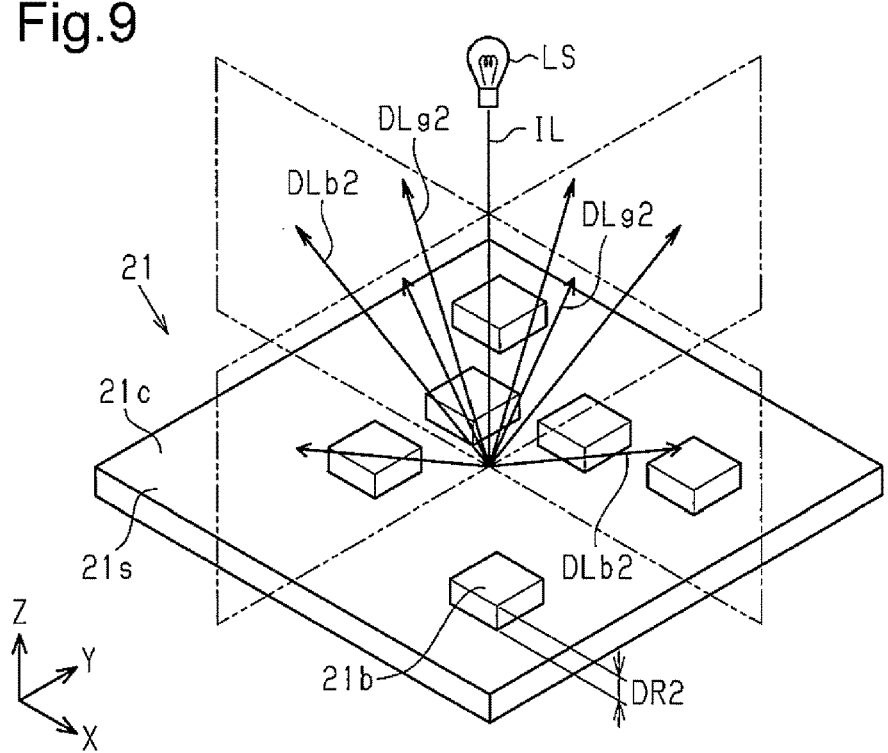
FIG. 9 is a diagram for illustrating the operation of the second reflection surfaces and the third reflection surface of the display portion.

In FIG. 8, for purpose of illustration, the second protrusions having second reflection surfaces 21b of the reflection layer 21 shown in FIG. 7 are not shown. In FIG. 9, for purpose of illustration, the first protrusions having first reflection surfaces 21a of the reflection layer 21 shown in FIG. 7 are not shown.

In addition, for purpose of illustration, white illumination light IL that is emitted toward the reflection layer 21 is described below as having a red light component, a green light component, and a blue light component only. However, the illumination light IL actually includes components of other colors.

As shown in FIG. 7, the reflection surface 21s, which is the obverse surface of the reflection layer 21, includes a plurality of first reflection surfaces 21a, a plurality of second reflection surfaces 21b, and a third reflection surface 21c. The first reflection surfaces 21a and the second reflection surfaces 21b are rectangular surfaces 21r, which are substantially square in shape.

In a plan view facing the reflection surface 21s, each rectangular surface 21r is separated from the other rectangular surfaces 21r, and the third reflection surface 21c occupies the gaps between adjacent ones of the rectangular surfaces 21r. In a plan view facing the reflection surface 21s, the rectangular surfaces 21r are arranged in a random manner, and the first reflection surfaces 21a and the second reflection surfaces 21b are arranged in a random manner in the reflection surface 21s of one display portion 12p.

The direction that is perpendicular to the X direction and the Y direction and parallel to the thickness direction of the substrate 11 is the Z direction. The first inter-reflection-surface distance DR1, which is the distance between the first reflection surfaces 21a and the third reflection surface 21c in the Z direction, is smaller than the second inter-reflection-surface distance DR2, which is the distance between the second reflection surfaces 21b and the third reflection surface 21c.

As shown in FIG. 8, when the illumination light IL emitted by the light source LS enter on the reflection surface 21s, the diffraction efficiency of red light having a wavelength of 630 nm is reduced in accordance with the first inter-reflection-surface distance DR1, for example. Thus, the components of the diffracted light emitted from the reflection surface 21s includes first blue light DLb1 having a wavelength of 460 nm and first green light DLg1 having a wavelength of 540 nm. Consequently, the light emitted from the reflection surface 21s includes light of a cyan color, which is the first color.

In the reflection surface 21s, the first reflection surfaces 21a are arranged in a random manner, and thus the first blue light DLb1 and the first green light DLg1 emitted from the reflection surface 21s each include the light directed in both of an XZ plane and a YZ plane on the reflection surface 21s. For purpose of illustration, FIG. 8 only shows the light beams emitted in the XZ plane and the YZ plane. However, the reflection surface 21s emits light also toward the space between the XZ plane and the YZ plane.

As shown in FIG. 9, when the illumination light IL emitted by the light source LS enter on the reflection surface 21s, the diffraction efficiency of red light having a wavelength of 680 nm, which differs from the wavelength of the light for which the diffraction efficiency is reduced in accordance with the first inter-reflection-surface distance DR1, is reduced in accordance with the second inter-reflection-surface distance DR2. Thus, the components of the diffracted light emitted from the reflection surface 21s include second blue light DLb2 having a wavelength of 510 nm and second green light DLg2 having a wavelength of 590 nm. Consequently, the light emitted from the reflection surface 21s includes light of a cyan color that is closer to green than the first color. This color is the second color, which differs from the first color.

In the reflection surface 21s, the second reflection surface 21b are arranged in a random manner, and thus the second blue light DLb2 and the second green light DLg2 emitted from the reflection surface 21s each include the light emitted in both of an XZ plane and a YZ plane on the reflection surface 21s. In a similar manner as FIG. 8, FIG. 9 only shows the light beams emitted in the XZ plane and the YZ plane for purpose of illustration. However, the reflection surface 21s emits light also toward the space between the XZ plane and the YZ plane.

As shown in FIG. 10, when the illumination light IL enter on the reflection surface 21s, the first blue light DLb1 and the first green light DLg1 are emitted in accordance with the first inter-reflection-surface distance DR1, and the second blue light DLb2 and the second green light DLg2 are emitted in accordance with the second inter-reflection-surface distance DR2. Accordingly, the reflection surface 21s emits the light that has the third color and in which the light of the first color, which is the mixture of the first blue light DLb1 and the first green light DLg1, and the light of the second color, which is the mixture of the second blue light DLb2 and the second green light DLg2, are mixed.

In addition, the rectangular surfaces 21r are arranged in a random manner in the reflection surface 21s, causing the light of the third color to be emitted in the XZ plane and the YZ plane and also toward the space between the XZ plane and the YZ plane.

Although FIGS. 8 to 10 show states in which the illumination light IL enter on a certain point in the display portion 12p, the light source LS actually emits light toward a predetermined area. As such, the illumination light IL enter on an area, rather than a point, in the display portion 12p.

Thus, the light perceived by the observer at a fixed point will be mixed light of multiple light beams of different wavelengths in a specific range.

Since the first inter-reflection-surface distance DR1 differs from the second inter-reflection-surface distance DR2 in the display portion 12p, the first inter-reflection-surface distance DR1 and the second inter-reflection-surface distance DR2 reduce the diffraction efficiency of mutually different wavelengths of light, as is evident from Equation (2). This allows the reflection surface 21s to emit light of the first color in accordance with the first inter-reflection-surface distance DR1 and the light of the second color in accordance with the second inter-reflection-surface distance DR2.

The light of the first color and the light of the second color are mixed when emitted from the display portion 12p, allowing the display portion 12p to emit light of the third color produced by additive mixing of two colors. Since the third color is produced by additive mixing of colors, the third color is pastel and has a lower chroma than the first color and the second color. The light having a color that is produced by additive mixing of colors cannot be obtained by a structure having only the first reflection surfaces 21a and the third reflection surface 21c, a structure having only the second reflection surfaces 21b and the third reflection surface 21c, or a relief diffraction grating.

As such, the display 10 emits light that forms an image having a color that cannot be displayed by the structures described above. The display 10 is capable of displaying an image of a wider variety of colors.

The displayed color, which is the color of the light emitted by the display portion 12p, is not perceived by the observer who is in a position where the diffracted light emitted by the display portion 12p does not reach. Thus, unlike a printed article object formed by dyes or pigments, the display portion 12p provides two states, a state in which the observer perceives the displayed color and a state in which the observer does not perceive the displayed color, depending on the position of the light source or the observer.

That is, the conditions for observing the display portion 12p include the conditions under which the light emitted by the display portion 12p can be perceived, and the conditions under which the light emitted by the display portion 12p cannot be perceived.

The conditions under which the light can be perceived may include an indoor situation in which the light from the light source LS, such as a fluorescent lamp, enter on the reflection surface 21s of the display 10 in the direction substantially perpendicular to the reflection surface 21s and the observer can visually perceive the light emitted from the display portion of the display 10. Further, the conditions under which the light can be perceived may include an outdoor situation in which the light, such as sunlight, enter on the reflection surface 21s in the direction substantially perpendicular to the reflection surface 21s and the observer can visually perceive the light emitted by the display portion 12p.

The conditions under which the light cannot be perceived may include a situation in which the light from the light source LS enter on the reflection surface 21s from the substantially horizontal direction, so that the display portion 12p hardly emits light. Further, the conditions under which the light cannot be perceived may include a situation in which the observer looks at the display 10 at such an angle that the diffracted light does not reach the observer even though the reflection surface 21s emits diffracted light.

Figure 11:
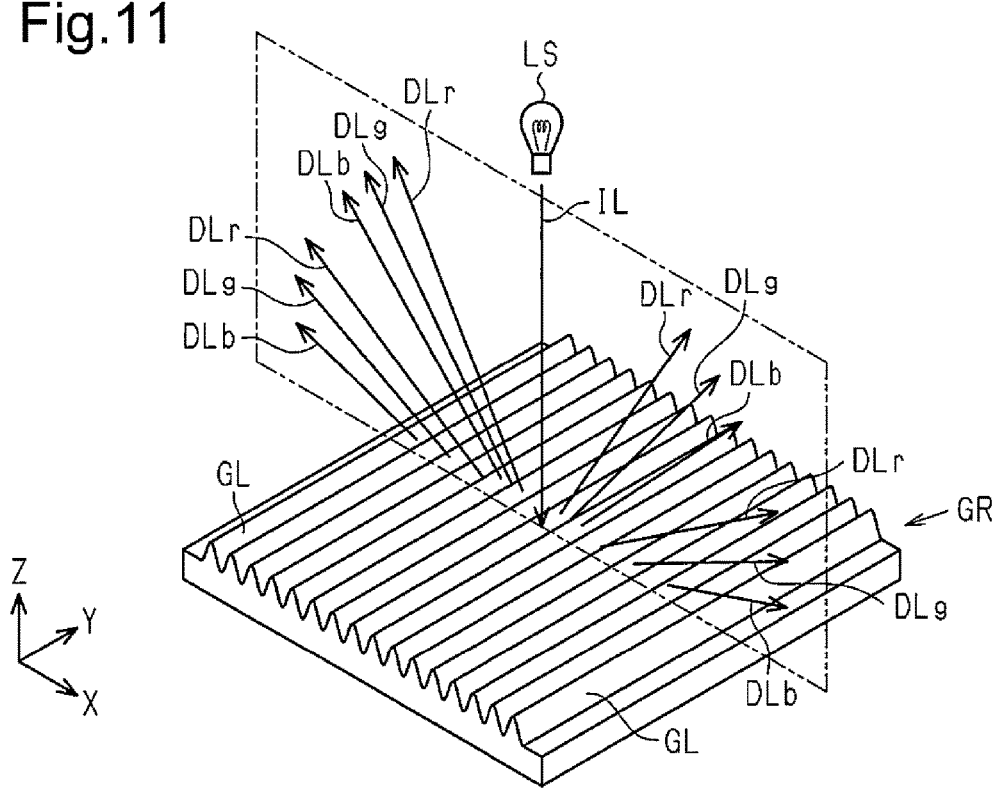
FIG. 11 is a diagram for illustrating the operation of a diffraction grating.

FIG. 11 shows a diffraction grating GR having a plurality of grating lines GL extending in the Y direction. The grating lines GL are arranged regularly in the X direction. This diffraction grating GR emits diffracted light as follows. When the illumination light IL emitted by the light source LS enter on the diffraction grating GR, the diffraction grating GR emits red diffracted light DLr, green diffracted light DLg, and blue diffracted light DLb in the XZ plane at mutually different emission angles in the X direction. The X direction is perpendicular to the Y direction, in which the grating lines GL extend.

When light enter on each of the display 10 and the diffraction grating GR, diffracted light is emitted as emission light. In addition, regular reflection light, or specular reflection light, is emitted in the direction of regular reflection relative to the incident direction of the incident light. The regular reflection light is emitted by the display 10 and the diffraction gratings GR regardless of the shapes of the minute structures of the display 10 and the diffraction gratings GR. When the observer looks at the display 10 having the reflection layer 21, the observer typically finds the regular reflection light too bright due to the high intensity of the regular reflection light. The observer thus looks at the display 10 such that the regular reflection light does not reach the eyes. As such, for purpose of illustration, the regular reflection light is not shown in FIGS. 11 to 13.

[Structure of Article]

Figure 12:
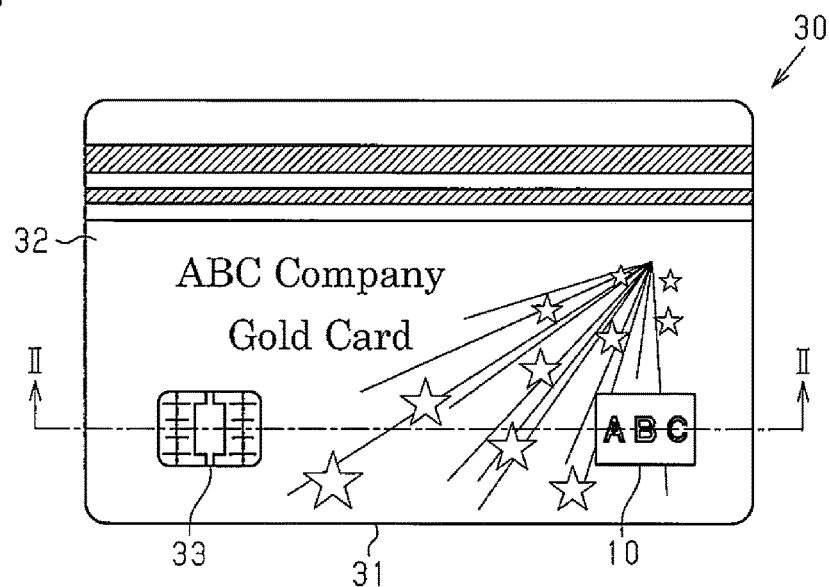
FIG. 12 is a plan view showing the planar structure of an IC card of the first embodiment in which the article of the present disclosure is embodied as an IC card.
Figure 13:
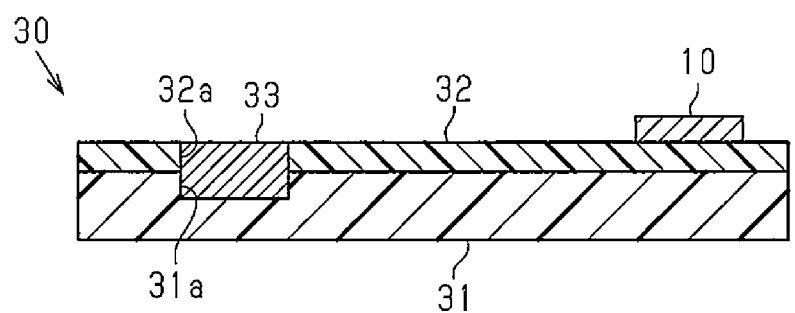
FIG. 13 is a cross-sectional view taken along line II-II in FIG. 12, showing the cross-sectional structure of the IC card.

Referring to FIGS. 12 and 13, the structure of an IC card that is an example of an article including the display 10 is now described. The display portions of the display 10 described above are capable of displaying an image having a specific color that cannot be displayed by printing using inks or the like, or by structures other than the reflection surface 21s described above. The image displayed by the display 10 is therefore difficult to reproduce with high accuracy, increasing the difficulty of counterfeiting the display 10. Accordingly, any article that includes the display 10 is difficult to counterfeit, so the display 10 may be used to prevent counterfeiting of articles.

As shown in FIG. 12, an integrated circuit (IC) card 30 includes a planar card substrate 31, which may be a plastic card substrate 31, a print layer 32 on which an image is printed, an IC chip 33, and a display 10.

As shown in FIG. 13, the print layer 32 is formed on the card substrate 31. The display 10 described above is fixed to the display surface, which is the surface of the print layer 32 that is opposite to the surface in contact with the card substrate 31. The display 10 is fixed using an adhesive layer, for example. The display 10 may be prepared as transfer foil or a sticker having an adhesive layer and affixed to the print layer 32, which is an example of the support portion.

The print layer 32 may have information including at least one of a character, a number, a symbol, and the like and a picture having aesthetic appearance. In addition to the upper side of the card substrate 31, the print layer 32 may be formed on the obverse surface of the display 10, which is opposite to the surface in contact with the print layer 32.

Alternatively, the display 10 may be affixed to the card substrate 31. In this case, the print layer 32 may be formed on the section of the card substrate 31 that is not covered by the display 10 and the obverse surface of the display 10, which is opposite to the surface in contact with the card substrate 31. In this structure, the card substrate 31 is an example of the support portion.

The print layer 32 is made of inks, which may include pigments or dyes, or toner composed, for example, of colored plastic particles. The inks and toner that may be used for the print layer 32 do not provide the optical effects of the display portions of the display 10. That is, the color and the brightness of the printed article formed by inks or toner remain substantially same regardless of any change in the observation conditions of the printed article. In other words, the image displayed by the printed article remains substantially same even when the observation conditions of the printed article are changed.

When the IC card 30 including the display 10 is observed under different observation conditions, the image displayed by the print layer 32 remains substantially same regardless of the observation conditions, while the image displayed by the display 10 vary under different observation conditions. Accordingly, when the IC card 30 is observed under different observation conditions, comparison between the print layer 32 and the display 10 clarifies the difference between the optical effect of the display 10 and that of the print layer 32. This allows for accurate authentication of the IC card 30 using the display 10.

Specifically, the brightness of the color of the image displayed by the print layer 32 is preferably equivalent to the brightness of the image displayed by the display 10 under certain observation conditions. Such a structure facilitates visual perception of the difference between a change in the brightness of the image displayed by the display 10 and a change in the brightness of the image displayed by the print layer 32 when the IC card 30 is observed under different observation conditions. The print layer 32 and the display 10 thus formed increases the effects of preventing counterfeiting.

The print layer 32 may be made of a functional ink that changes the visual effect of the print layer 32 when the observation conditions of the print layer 32 are changed. The functional ink may change the image displayed by the print layer 32 when the observation conditions of the print layer 32 are changed. The functional ink may be a phosphorescent ink, liquid crystal, or an ink that is invisible when illuminated with visible light and becomes visible when illuminated with ultraviolet rays or infrared rays. When the ink that is visible when illuminated with ultraviolet rays or infrared rays is used, the information formed by the ink is hidden from the observer when the ink is illuminated with visible light. When the information is illuminated with ultraviolet rays or infrared rays, the information is reproduced for the observer.

In addition to providing the visual effect that changes when the observation conditions of the print layer 32 are changed, the print layer 32 formed by the functional ink provides a visual effect that differs from that of the display portion. Thus, combining the display 10 and the print layer 32 formed by functional ink further increases the anti-counterfeiting effect.

Further, the print layer 32 may be a layer whose color changes when energy, such as a laser beam, an ultraviolet ray, heat, or pressure, is applied.

The surface of the card substrate 31 that is in contact with the print layer 32 has a depression 31a, which extends toward the surface that is opposite to the surface in contact with the print layer 32. The print layer 32 includes a through hole 32a in the position aligned with the depression 31a as viewed in the thickness direction of the IC card 30. The IC chip 33 is fitted into the depression 31a and the through hole 32a. The IC chip 33 has an obverse surface, which is surrounded by the print layer 32 and includes a plurality of electrodes. Information is written into and read from the IC chip 33 through the electrodes.

The IC card 30 is difficult to counterfeit since the IC card 30 has the display 10 that is difficult to counterfeit. Moreover, the IC card 30 has the IC chip 33 and the print layer 32 in addition to the display 10. The electronic data of the IC chip 33 and the visual effects of the display 10 and the print layer 32 facilitate prevention of counterfeiting.

[Method for Producing Display]

A method for producing the display 10 is now described.

To produce the display 10, a light transmissive plastic sheet or film is prepared as the support layer 22. The support layer 22 may be made of polyethylene terephthalate (PET) or polycarbonate (PC), for example. Light transmissive synthetic resin, such as thermoplastic resin, thermosetting resin, or photosetting resin, is applied to one surface of the support layer 22 to form a coating. The formed coating is kept in close contact with a metal stamper while the resin is cured. When the coating is made of a thermosetting resin, heat is applied to the coating to cure the resin. When the coating is made of a photosetting resin, light is applied to the coating to cure the resin.

The metal stamper is removed from the cured coating so that an relief layer 23 having a covered surface 23s is formed. The support layer 22 is in close contact with the relief layer 23. Thus, when the support layer 22 and the relief layer 23 are made of the same material, there is no boundary between the support layer 22 and the relief layer 23. As such, the support layer 22 and the relief layer 23 may be considered as a substrate 11 that is formed by a single layer.

Then, a reflection layer 21 is formed on the covered surface 23s of the substrate 11 so as to conform to the shape of the covered surface 23s. The reflection layer 21 may be formed by vapor-phase deposition, such as vacuum deposition or sputtering.

In the reflection layer 21, the following situations reduce the effect of light beams canceling each other by interference. The situations include a situation in which the sections of the reflection layer 21 located on the first covered surfaces 23a, the sections located on the second covered surfaces 23b, and the section located on the third covered surface 23c have low flatness, and a situation in which the thickness of the sections located on the first covered surfaces 23a, the thickness of the sections located on the second covered surfaces 23b, and the thickness of the section located on the third covered surface 23c are not uniform.

Such situations lower the diffraction efficiency for a wider range of light wavelengths, reducing the difference between the distribution of wavelengths in the light emitted by the display 10 and the distribution of wavelengths in the white incident light. This lowers the chroma of the color of the light emitted by the display 10, causing the color of the emitted light to resemble white.

Thus, the reflection layer 21 is preferably formed such that the first reflection surfaces 21a, the second reflection surfaces 21b, and the third covered surface 23c are substantially parallel to one another, conforming to the flatness of the first covered surfaces 23a, the second covered surfaces 23b, and the third covered surface 23c.

The reflection layer 21 may be either of a metal layer and a dielectric layer. When the reflection layer 21 is a metal layer, the reflection layer 21 may be made of aluminum, silver, gold, or an alloy of these metals. When the reflection layer 21 is a dielectric layer, the reflection layer 21 may be made of zinc sulfide (ZnS) or titanium oxide ($TiO_2$).

Further, when the reflection layer 21 is a dielectric layer, the reflection layer 21 may be of a single-layer structure or a multilayer structure. Adjacent ones of the layers forming the multilayer structure may have different refractive indices.

The thickness of the reflection layer 21 is preferably between 30 nm and 150 nm inclusive, more preferably between 30 nm and 70 nm inclusive, and yet more preferably 50 nm. The reflection layer 21 may be formed as a thin film by vapor-phase deposition. However, when the reflection layer 21 is made of one of the metals described above, granular structures tend to form on the obverse surface of the reflection layer 21. The greater the thickness of the reflection layer 21, the larger granular structures become. For this reason, the reflection layer 21 preferably has a small thickness to increase flatness of the reflection layer 21. However, if the thickness of the reflection layer 21 is too small, the reflection layer 21 fails to sufficiently reflect light.

Through a thorough study of the relationship between the thickness of the reflection layer 21 and the function of the reflection layer 21, the inventor of the present application has discovered that the thickness of the reflection layer 21 is preferably between 30 nm and 150 nm inclusive in order for the reflection layer 21 to have desirable flatness and to fully function to reflect light.

As described above, the reflection layer 21 may cover the entire covered surface 23s of the substrate 11, or may cover a part of the covered surface 23s. That is, the reflection layer 21 may partially cover the covered surface 23s. When the reflection layer 21 partially covers the covered surface 23s, the reflection layer 21 may form an image, such as picture, character, or symbol, using the section of the covered surface 23s on which the reflection layer 21 is formed and the section that is free of the reflection layer 21.

The reflection layer 21 that partially covers the covered surface 23s may be formed by first forming the reflection layer 21 over the entire covered surface 23s by vapor-phase deposition and then dissolving part of the reflection layer 21 using an agent. Alternatively, the reflection layer 21 that partially covers the covered surface 23s may be formed by first forming the reflection layer 21 over the entire covered surface 23s and then peeling part of the reflection layer 21 from the relief layer 23 using an adhesive material having a higher adhesiveness to the reflection layer 21 than the relief layer 23. The reflection layer 21 that partially covers the covered surface 23s may also be formed by vapor-phase deposition using a mask, or a lift-off method.

The display 10 may include other functional layers, such as a protection layer for protecting the obverse surface of the display 10 or an antibacterial coating layer that covers the obverse surface of the display 10 to inhibit the growth of bacteria on the obverse surface of the display 10.

[Method for Producing Original Plate]

Figure 14:
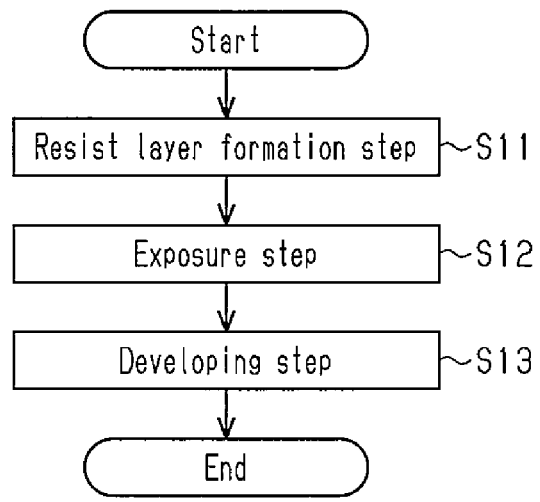
FIG. 14 is a flowchart for illustrating the sequence in the method for producing an original plate.
Figure 15:
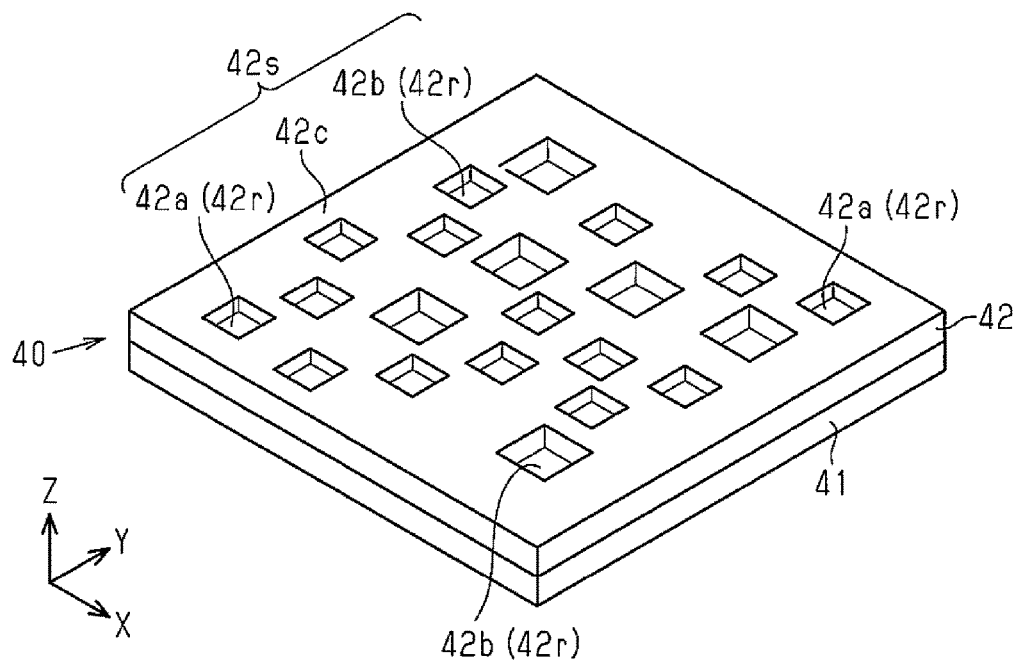
FIG. 15 is a perspective view showing the structure of an original plate.

Referring to FIGS. 14 and 15, a method for producing an original plate for producing a display 10 is now described. The original plate is used to produce a display 10 that includes a covered surface 23s, which includes first covered surfaces 23a, second covered surfaces 23b, and a third covered surface 23c, and a reflection layer 21, which covers the covered surface 23s. The original plate is used as the die for the metal stamper described above.

Figure 16:
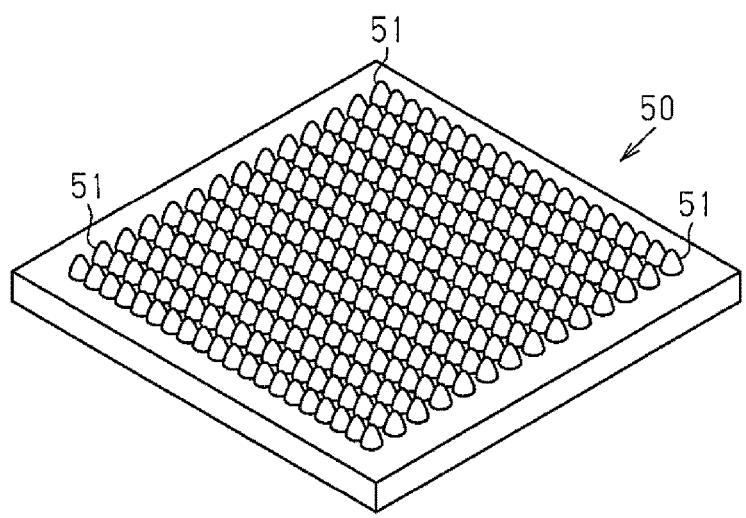
FIG. 16 is a perspective view showing the structure of an example of an anti-reflection portion of a display of a modification.

As shown in FIG. 16, the method for producing an original plate includes a step of forming a resist layer on a surface of a substrate (Step S11), a step of exposing the resist layer to light (Step S12), and a step of developing the exposed resist layer to form a transfer surface in the resist layer (Step S13). That is, the method for producing the original plate includes a resist layer formation step, an exposure step, and a developing step.

The resist layer formation step may include preparing a planar glass substrate and applying a resist on a surface of the glass substrate to form a resist layer. The resist may be an electron-beam resist or a photoresist. The resist is a positive resist, and the exposed portion of the resist is more soluble to developer than unexposed portion. In developing step, the exposed portion of the resist is removed from the unexposed portion.

The exposure step includes exposing the resist layer as follows. The exposure step exposes the resist layer to light such that the transfer surface after developing includes a plurality of first transfer surfaces for forming first covered surfaces 23a, a plurality of second transfer surfaces for forming second covered surfaces 23b, and a third transfer surface for forming a third covered surface 23c. In addition, the exposure step exposes the resist layer such that the first transfer surfaces and the second transfer surfaces are rectangular transfer surfaces that are substantially square in shape and the third transfer surface occupies gaps between adjacent ones of the rectangular transfer surfaces in a plan view facing the transfer surface.

Furthermore, the exposure step exposes the resist layer such that the distance between the first transfer surfaces and the third transfer surface in the thickness direction of the glass substrate is set to an extent that is able the reflection surface 21s of the reflection layer 21 to emit light of the first color by the interference between the light reflected from the sections of the reflection surface 21s of the reflection layer 21 that are located on the first covered surfaces 23a and the light reflected from the section located on the third covered surface 23c.

Furthermore, the exposure step exposes the resist layer such that the distance between the second transfer surfaces and the third transfer surface in the thickness direction of the glass substrate is set to an extent that is able the reflection surface 21s of the reflection layer 21 to emit the light of the second color, which differs from the first color, by the interference between the light reflected from the sections of the reflection surface 21s of the reflection layer 21 that are located on the second covered surfaces 23b and the light reflected from the section located on the third covered surface 23c.

In addition, the exposure step includes exposing the resist layer such that the transfer surface is configured so as to capable the reflection surface 21s of the reflection layer 21 to emit the light that has the third color and includes the light of the first color and the light of the second color.

Specifically, the exposure step defines the sections of the original plate that correspond to the first reflection surfaces 21a of the display 10, the sections that correspond to the second reflection surfaces 21b, and the section that corresponds to the third reflection surface 21c. When the resist layer is made of an electron-beam resist, the exposure of the resist layer is performed by irradiating the resist layer with electron beams. When the resist layer is made of a photoresist, the exposure of the resist layer is performed by irradiating the resist layer with laser beams of ultraviolet wavelengths.

In the exposure step, the glass substrate is placed on an XY stage, which can move two-dimensionally in the X direction, which is one direction, and the Y direction perpendicular to the X direction. The resist layer is irradiated with electron beams or laser beams and subjected to pattern exposure while the XY stage is moved by a controller that controls the movement of the XY stage.

When the resist is an electron-beam resist, the variable-shaped beam exposure method, or the rectangular beam exposure method, is preferably used to irradiate the electron-beam resist with electron beams. In the variable-shaped beam exposure method, the electron beam from an electron gun passes through shaping apertures, which are rectangular openings as viewed in the irradiation direction of the electron beam, so that the shape of the electron beam in a cross-section perpendicular to the irradiation direction of the electron beam changes to a rectangular shape before the electron beam strikes the obverse surface of the resist layer.

In the spot beam exposure method, the electron beam strikes the resist layer without passing through shaping apertures, and the flexibility of the exposure pattern is greater than that of the variable-shaped beam exposure method. However, the spot beam exposure method provides a smaller irradiation area in one exposure and therefore takes more time for patterning than the variable-shaped beam exposure method. The variable-shaped beam exposure method provides a larger irradiation area in one exposure than the spot beam exposure method. In addition, the irradiation area of each exposure is variable, allowing for shortening of the time required for patterning.

In the variable-shaped beam exposure method, the section of the resist layer corresponding to each of the first covered surfaces 23a and the second covered surfaces 23b of the display portion is preferably patterned in one exposure. This allows the entire section corresponding to each of the first covered surfaces 23a and the second covered surfaces 23b to be exposed under same conditions. This increases the flatness of the first covered surfaces 23a and the second covered surfaces 23b as compared to when the section corresponding to each of the first covered surfaces 23a and the second covered surfaces 23b is patterned in multiple exposures.

In addition, when each section corresponding to one first covered surface 23a is patterned in one exposure, the sections corresponding to first covered surfaces 23a are exposed under substantially same conditions. Consequently, the sections corresponding to the first covered surfaces 23a are substantially equal to one another in distance in which the energy for dissolving resist is obtained from the electron beam. This distance is measured in the thickness direction of aresist layer. The section corresponding to each second covered surface 23b is also patterned in one exposure. Consequently, in a similar manner as the sections corresponding to the first covered surfaces 23a, the sections corresponding to the second covered surfaces 23b are equal to one another in distance in which the energy for dissolving the resist is obtained from the electron beam. This distance is measured in the thickness direction of the resist layer.

As described above, the first length L1 of the first reflection surfaces 21a is smaller than the second length L2 of the second reflection surfaces 21b, and the area of each first reflection surface 21a is smaller than the area of each second reflection surface 21b. The first length L1 of the first reflection surfaces 21a and the second length L2 of the second reflection surfaces 21b are between 0.3 μm and 2 μm inclusive. In the thickness direction of the substrate 11, the first inter-reflection-surface distance DR1 is smaller than the second inter-reflection-surface distance DR2.

In the exposure process of the resist layer using electron beams, larger the area irradiated with electron beams, greater the distance in which the energy for dissolving the resist is obtained from the electron beam in the thickness direction of the resist layer, even when the amounts of energy provided by the electron beams are same.

In the display 10, the area of each first reflection surface 21a, which is closer to the third reflection surface 21c, is smaller than the area of each second reflection surface 21b. Thus, even when the sections of the resist layer that correspond to the first reflection surfaces 21a and the sections that correspond to the second reflection surfaces 21b receive same amount of energy, the distance in which the energy for dissolving the resist is obtained from electron beams in the sections corresponding to the first reflection surfaces 21a is less than the distance in which the energy for dissolving the resist is obtained from electron beams in the sections corresponding to the second reflection surfaces 21b.

In a structure in which a rectangular surface 21r of the display 10 is in contact with another rectangular surface 21r, an irradiated region and another irradiated region that is in contact with the irradiated region are irradiated with electron beams in the exposure process of the resist layer. Consequently, the electron beam that strikes one of the two irradiated regions scatters to the other, and the amount of energy given by the electron beams becomes excessive at the boundary between the two irradiated regions. This lowers accuracy of shape at the boundary between the two irradiated regions after developing process.

For this reason, in the display 10, each rectangular surface 21r in each display portion is preferably separated from the other rectangular surfaces 21r. In addition, in a plurality of display portions, the rectangular surfaces 21r in a display portion are preferably separated by gaps from the rectangular surfaces 21r of the other display portions adjacent to the display portion.

In the developing step, the resist layer irradiated with electron beams or laser beams is developed. This process removes the section of resist layer irradiated with electron beams or laser beams from the section that is not irradiated with electron beams or laser beams, forming the transfer surface, which is an uneven surface, in the obverse surface of the resist layer.

That is, as shown in FIG. 15, an original plate 40 includes a glass substrate 41 and a resist layer 42. The resist layer 42 includes a transfer surface 42s, which is opposite to the surface that is in contact with the glass substrate 41. The transfer surface 42s includes a plurality of first transfer surfaces 42a for forming first covered surfaces 23a, a plurality of second transfer surfaces 42b for forming second covered surfaces 23b, and a third transfer surface 42c for forming a third covered surface 23c.

Transferring the transfer surface 42s forms the covered surface 23s of the display 10. In the covered surface 23s, the first covered surfaces 23a are formed by transferring the first transfer surfaces 42a, the second covered surfaces 23b are formed by transferring the second transfer surface 42b, and the third covered surface 23c is formed by transferring the third transfer surface 42c.

In a plan view facing the transfer surface 42s, the first transfer surfaces 42a and the second transfer surface 42b are rectangular transfer surfaces 42r, which are substantially square in shape, and the third transfer surface 42c occupies gaps between adjacent ones of the rectangular transfer surfaces 42r.

In the original plate 40, the distance between the first transfer surfaces 42a and the third transfer surface 42c is equal to the first inter-covered-surface distance DC1, and the distance between the second transfer surfaces 42b and the third transfer surface 42c is equal to the second inter-covered-surface distance DC2.

That is, the distance between the first transfer surfaces 42a and the third transfer surface 42c is set to an extent that is able for emission of light of the first color by the interference between the light reflected from the first reflection surfaces 21a located on the first covered surfaces 23a of the display 10 and the light reflected from the third reflection surface 21c located on the third covered surface 23c.

In addition, the distance between the second transfer surfaces 42b and the third transfer surface 42c is set to an extent that is able for emission of light of the second color by the interference between the light reflected from the second reflection surfaces 21b located on the second covered surfaces 23b of the display 10 and the light reflected from the third reflection surface 21c located on the third covered surface 23c.

The transfer surface 42s is thus formed such that the reflection surface 21s emits the light that has third color and includes first color light and second color light.

The original plate 40 produced as described above is subjected to a process such as electroforming to form a metal stamper having the uneven surface to which the transfer surface 42s of the original plate 40 has been transferred.

The advantages of the first embodiment of a display, an article, an original plate, and a method for producing an original plate are now described.

(1) When white light enter on the display 10, light of first color which is determined by the first inter-reflection-surface distance DR1 and light of second color which differs from the first color and is determined by the second inter-reflection-surface distance DR2 are emitted. The display 10 emits light having third color which includes the first color and the second color. The third color is a color produced by additive mixing of two colors. The third color therefore has a lower chroma than the first color and the second color. This allows the display 10 to produce a color that cannot be displayed by a structure having only the first reflection surfaces 21a and the third reflection surface 21c, or a structure having only the second reflection surfaces 21b and the third reflection surface 21c, enabling the display 10 to display an image with a wider variety of colors.

(2) The first length L1 differs from the second length L2. This increases flexibility in designing the area occupied by the reflection surfaces and positions of the reflection surfaces.

(3) Since the rectangular surfaces 21r are arranged in a random manner in the reflection surface 21s, the reflection surface 21s is likely to emit light isotropically. This enlarges the region in which the light emitted from the reflection surface 21s is perceived, as compared to a structure that emits light in specific directions.

(4) When the area of the plurality of rectangular surfaces 21r is 50% of the total area of the obverse surface of the reflection layer, the intensity of colored light emitted from the reflection layer 21 is maximized. When the area of the plurality of rectangular surfaces 21r is greater than or equal to 15% of the total area of the reflection surface 21s, the intensity of colored light emitted from the reflection layer 21 is high enough to be perceived by the observer.

(5) The percentage of the first unit area S1 to the third unit area S3 is greater than or equal to 70%, so that the intensity of the first color light is predominant in the light emitted by the display. As such, the first color is predominant in the color of the image displayed by the display 10, and the second color acts as an additional color that modifies the first color. This allows for adjustment of the chroma of the color of the image displayed by the display 10 without significantly changing the hue of color of the image from the hue of the first color.

(6) When the third inter-reflection-surface distance DR3 is between 0.02 μm and 0.1 μm inclusive, the third inter-reflection-surface distance DR3 is small enough so that the first color is not significantly different from the second color in hue. Still, the display 10 emits light of an halftone color that is produced by mixing the first color and the second color and that cannot be achieved by a structure having only the first reflection surfaces 21a and the third reflection surface 21c, or a structure having only the second reflection surfaces 21b and the third reflection surface 21c.

(7) When the third inter-reflection-surface distance DR3 is between 0.2 μm and 0.45 μm inclusive, the third inter-reflection-surface distance DR3 is large enough so that the first color is significantly different from the second color in hue. Thus, the display 10 emits light of an halftone color that is produced by mixing two colors of different hues and that cannot be achieved by a structure having only the first reflection surfaces 21a and the third reflection surface 21c, or a structure having only the second reflection surfaces 21b and the third reflection surface 21c.

Modifications of First Embodiment

The above-described first embodiment may be modified as follows.

The article is not limited to an IC card and may be other cards, such as a magnetic card, a wireless card, and an identification (ID) card. Alternatively, the article may be securities, such as banknotes or gift certificates, or a luxury product, such as an art object. Further, the article may be a tag to be attached to a product that should be authenticated, or may be a package enclosing a product that should be authenticated, or a part of the package.

In addition to the display portion described above, the reflection surface 21s of the reflection layer 21 of the display may include a portion of different functionality, which is a region having an optical effect that differs from that of the display portion. The portion of different functionality includes at least one of a diffraction portion that diffracts the light incident on the reflection surface 21s, an anti-reflection portion that prevents reflection of the light incident on the reflection surface 21s, and a light scattering portion that scatters the light incident on the reflection surface 21s.

The diffraction portion may be diffraction grating that is described above with reference to FIG. 11 and diffracts the light incident on the reflection surface 21s to emit light of iridescent colors that change depending on the conditions under which the observer looks at the display.

Figure 18:
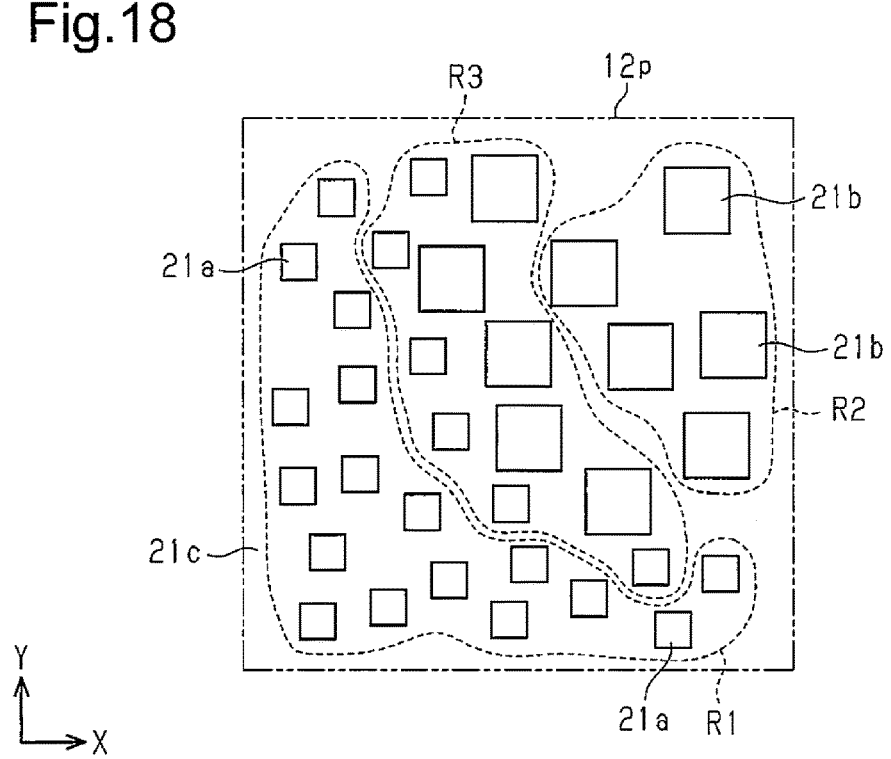
FIG. 18 is a plan view showing the planar structure of a display portion of a modification as viewed facing the reflection surface.

As shown in FIG. 18, an anti-reflection portion 50 includes a plurality of minute protrusions 51 arranged at a pitch that is shorter than or equal to visible wavelengths. The protrusions 51 reduce reflection of the light incident on the protrusions 51. The anti-reflection portion 50 displays a black color accordingly.

Figure 17:
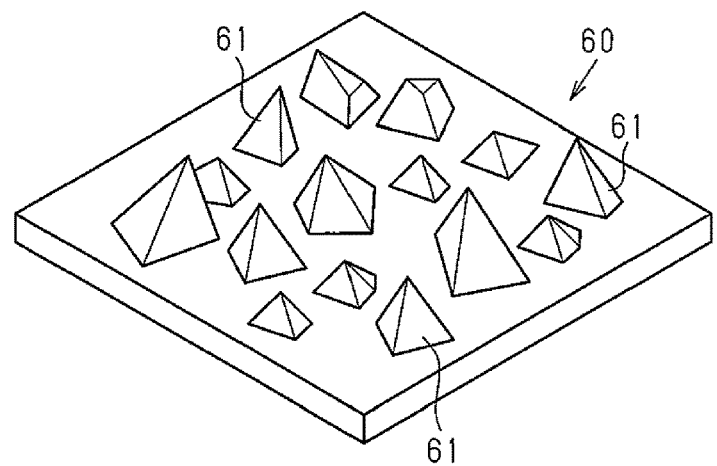
FIG. 17 is a perspective view showing the structure of an example of a light scattering portion of a display of a modification.

As shown in FIG. 17, a light scattering portion 60 includes a plurality of protrusions 61 that differ from one another in at least one of size as viewed facing the reflection surface 21s of the display and dimension in the thickness direction of the display. The dimension of each protrusion 61 in the thickness direction of the display is a few μm or greater, for example. The light scattering portion 60 diffusely reflects light incident on the light scattering portion 60 and emits white light.

This configuration has following advantage.

(8) The reflection surface 21s includes at least one of diffraction portion, the anti-reflection portion 50, and the light scattering portion 60. Accordingly, the display has an additional optical effect that differs from the optical effect of emitting colored light. The display thus provides complex optical effects as compared to a structure in which the reflection surface 21s includes only the display portion. This increases the difficulties in counterfeiting the display.

As long as mixing the first color light and the second color light produces the light of the third color, the distance between the first reflection surfaces 21a and the second reflection surfaces 21b may be less than 0.2 μm or greater than 0.45 μm.

As long as mixing the first color light and the second color light produces the light of the third color, the distance between the first reflection surfaces 21a and the second reflection surfaces 21b may be less than 0.02 μm or greater than 0.1 μm.

In a plurality of display portions 12p forming the first display region 12, each display portion 12p is preferably substantially identical to the other display portions 12p in the first unit area S1. The percentage of the second unit area S2 to the third unit area S3 is referred to as a second reflection surface ratio. The second reflection surface ratios of display portions 12p may be greater than or equal to 1% and less than 30%, and may have different extents. The plurality of display portions 12p includes an example of the third display portion and an example of the fourth display portion.

This configuration has the following advantage.

(9) The display portions 12p are substantially identical to one another in the first unit area S1, limiting variance in the color of light emitted from the display portions 12p. The first reflection surface ratio is greater than or equal to 70% so that the intensity of the first color light is predominant in the light emitted by the display 10. As such, the first color is predominant in the color of the image displayed by the display 10, and the second color acts as an additional color that modifies the first color.

On the other hand, the second reflection surface ratios of the display portions 12p have different values that are greater than or equal to 1% and less than 30%. This increases variety of chroma of the color of the image displayed by the display without significantly changing the hue of color of the image from the hue of the first color.

When the second reflection surface ratios of the display portions 12p are greater than or equal to 1% and less than 30% and have different extents, the second reflection surface ratios of the display portions 12p that are arranged side by side may vary gradually.

For example, when display portions 12p are arranged in a column direction, which is one direction, and a row direction perpendicular to the column direction, the second reflection surface ratios of the display portions 12p that are arranged side by side in the column direction may vary gradually by a predetermined proportion. Alternatively, the second reflection surface ratios of the display portions 12p that are arranged side by side in the row direction may vary gradually by a predetermined proportion. Further, the second reflection surface ratios of the display portions 12p may vary gradually by a predetermined proportion along the column direction and the row direction.

Such structures allow the chroma of the color of the image displayed by the first display region 12 to vary gradually in at least one of the column direction and the row direction.

Ratio of The rectangular surface may be less than 15%. Such a structure still has an advantage equivalent to advantage (1) since the reflection surface 21s emits light of the third color produced by light of the first color and light of the second color.

Ratio of The first reflection surface may be less than 70%. Such a structure still has an advantage equivalent to advantage (1) since the reflection surface 21s emits light of the third color produced by light of the first color and light of the second color.

In the reflection surface 21s, the area occupied by all the first reflection surfaces 21a is referred to as a first reflection area, and the area occupied by all the rectangular surfaces 21r is referred to as a rectangular area. Even when a plurality of display portions 12p includes display portions 12p each having a ratio of first reflection surface of less than 15%, the rectangular area in the reflection surface 21s may be between 15% and 50% inclusive of the total area of the reflection surface 21s.

Even when a plurality of display portions 12p includes display portions 12p each having a first reflection surface ratio of less than 70%, the first reflection area of the reflection surface 21s can still be greater than or equal to 70% and less than 100% of the rectangular area.

FIG. 18 shows the planar structure of a display portion 12p in a plan view facing the reflection surface 21s in a similar manner as FIG. 4.

As shown in FIG. 18, in one display portion 12p, the reflection surface 21s may include a first region R1, in which a plurality of first reflection surfaces 21a is located, a second region R2, in which a plurality of second reflection surfaces 21b is located, and a third region R3, in which a plurality of first reflection surfaces 21a and a plurality of second reflection surfaces 21b are located.

The third region R3 includes first reflection surfaces 21a and second reflection surfaces 21b, and each first reflection surface 21a is adjacent to at least one second reflection surface 21b, and each second reflection surface 21b is adjacent to at least one first reflection surface 21a.

In such a structure, since light of the first color and light of the second color are both emitted from the third region R3, they are mixed at high resolution in the third region R3.

The third region R3 separates the first region R1 from the second region R2 in one display portion 12p. However, the display portion 12p is dimensioned such that the first color light and the second color light produced by the display portion 12p are mixed and emitted as light of the third color, allowing the display portion 12p to emit the third color light.

As long as the reflection layer 21 can emit the third color light produced by the first color light and the second color light, the plurality of display portions 12p forming the first display region 12 may include a display portion 12p that includes first reflection surfaces 21a but does not include a second reflection surface 21b. Further, the plurality of display portions 12p may include a display portion 12p that includes second reflection surfaces 21b but does not include a first reflection surface 21a. Such a structure still has an advantage equivalent to advantage (1) as long as the reflection layer 21 including the plurality of display portions 12p can emit the third color light.

Figure 19:
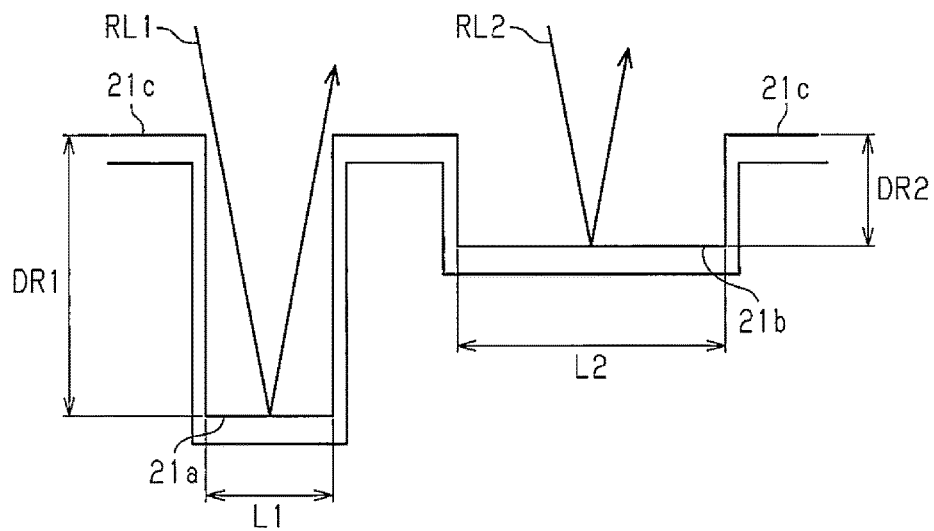
FIG. 19 is an enlarged cross-sectional view showing a part of the cross-sectional structure of the display of a modification.

As shown in FIG. 19, the first length L1 of the first reflection surface 21a may be smaller than the second length L2 of the second reflection surface 21b, and the first inter-reflection-surface distance DR1 may be greater than the second inter-reflection-surface distance DR2.

A greater first inter-reflection-surface distance DR1 increases the wavelength of the light produced by the interference between the light emitted from the first reflection surfaces 21a and the light emitted from the third reflection surface 21c. In addition, a greater second inter-reflection-surface distance DR2 increases the wavelength of the light produced by the interference between the light emitted from the second reflection surfaces 21b and the light emitted from the third reflection surface 21c. On the other hand, a shorter wavelength of light increases the scattering angle of the light. Consequently, the structures described above have the following advantage.

(10) The area of each second reflection surface 21b, which functions to emit light at a smaller scattering angle, is greater than the area of each first reflection surface 21a, which functions to emit light at a larger scattering angle. Thus, the light beams emitted at smaller scattering angles are likely to be directed toward a larger area in a plan view facing the reflection surface 21s. This facilitates mixing of the light produced by the first reflection surfaces 21a and the third reflection surface 21c and the light produced by the second reflection surfaces 21b and the third reflection surface 21c.

The first lengths L1 of the first reflection surfaces 21a may have different extents, and the second lengths L2 of the second reflection surfaces 21b may have different extents. Such a structure still allows the reflection surface 21s to emit light of the first color as long as each first reflection surface 21a is substantially identical to the other first reflection surfaces 21a in the first inter-reflection-surface distance DR1. Further, as long as each second reflection surface 21b is substantially identical to the other second reflection surfaces 21b in the second inter-reflection-surface distance DR2, the reflection surface 21s can emit light of the second color, allowing the reflection surface 21s to emit light of the third color.

In a plan view facing the reflection surface 21s, a rectangular surface 21r may overlap with an adjacent rectangular surface 21r. Such a structure still has an advantage equivalent to advantage (1) since the reflection surface 21s can emit light of the third color. In addition, this structure allows the first reflection surface ratio of the display portion 12p to be greater than 50%.

Further, each display portion 12p may differ from the other display portions 12p in the first inter-reflection-surface distance DR1 and the second inter-reflection-surface distance DR2.

Figure 20:
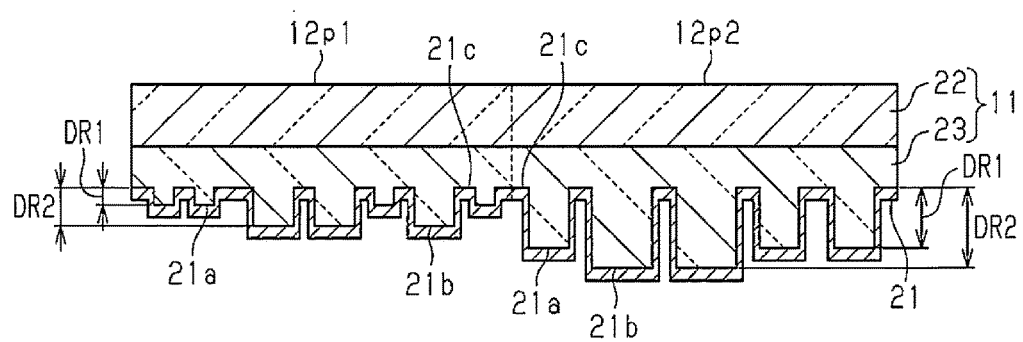
FIG. 20 is a cross-sectional view showing a part of the cross-sectional structure of a display of a modification.

That is, as shown in FIG. 20, the first inter-reflection-surface distance DR1 in a display portion 12p1 may differ from the first inter-reflection-surface distance DR1 in another display portion 12p2, and the second inter-reflection-surface distance DR2 in the display portion 12p1 may differ from the second inter-reflection-surface distance DR2 in the display portion 12p2.

In the example shown in FIG. 20, the first inter-reflection-surface distance DR1 in the display portion 12p1 is smaller than the first inter-reflection-surface distance DR1 in the display portion 12p2, and the second inter-reflection-surface distance DR2 in the display portion 12p1 is smaller than the second inter-reflection-surface distance DR2 in the display portion 12p2. Consequently, the third color light emitted from the display portion 12p1 differs in color from the third color light emitted from the display portion 12p2.

In a plurality of display portions 12p, the display portion 12p1 may differ from the display portion 12p2 only in the first inter-reflection-surface distance DR1. Alternatively, in a plurality of display portions 12p, the display portion 12p1 may differ from the display portion 12p2 only in the second inter-reflection-surface distance DR2. In these structures, the third color light emitted from the display portion 12p1 still differs in color from the third color light emitted from the display portion 12p2.

The color of the light emitted from each display region may be identical to the color of the light emitted from the other display regions. That is, each display region may be identical to the other display regions in the first inter-reflection-surface distance DR1 and the second inter-reflection-surface distance DR2.

Alternatively, the color of the light emitted from each display region may differ from the colors of the light emitted from the other display regions. That is, each display region may differ from the other display regions in at least one of the first inter-reflection-surface distance DR1 and the second inter-reflection-surface distance DR2.

Further, the display 10 may include a plurality of display region groups, each including at least one display region. The display regions in one display region group may emit light of same color, and the display regions in each display region group may emit light of a color that differs from the colors of the light emitted by the display regions in the other display region groups.

The purpose of the display is not limited to preventing counterfeiting. The display may be used to decorate an article. Further, the display may be a display that is observed for its own quality. The display that is observed for its own quality may be used as an item such as a toy or a learning material.

Second Embodiment

Referring to FIGS. 21 to 24, the second embodiment of a display, an article, an original plate, and a method for producing an original plate according to the present disclosure is now described. The second embodiment differs from the first embodiment in the position of the rectangular surfaces 21r in the reflection surface 21s. Thus, the following descriptions will focus on the differences from the first embodiment in structure of the display. Same reference numerals are given to those components that are same as the corresponding components of the first embodiment. Such components will not be described in detail.

[Structure of Display]

Figure 21:
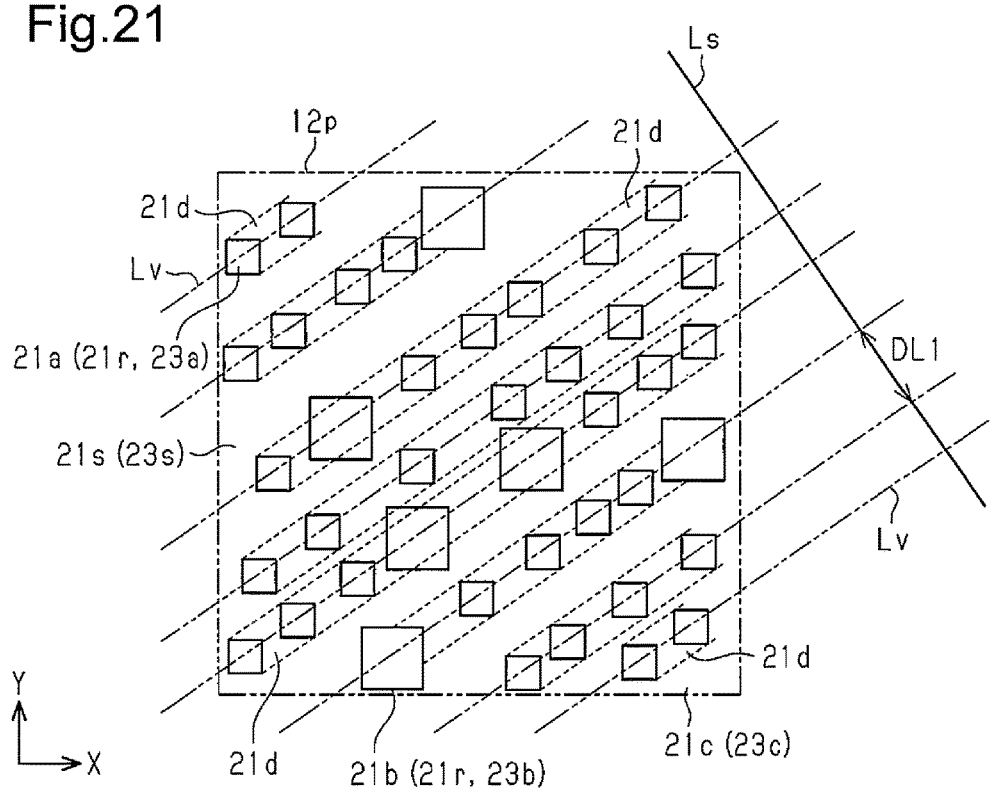
FIG. 21 is a plan view showing the planar structure of a display portion of a second embodiment of a display according to the present disclosure as viewed facing the reflection surface.
Figure 22:
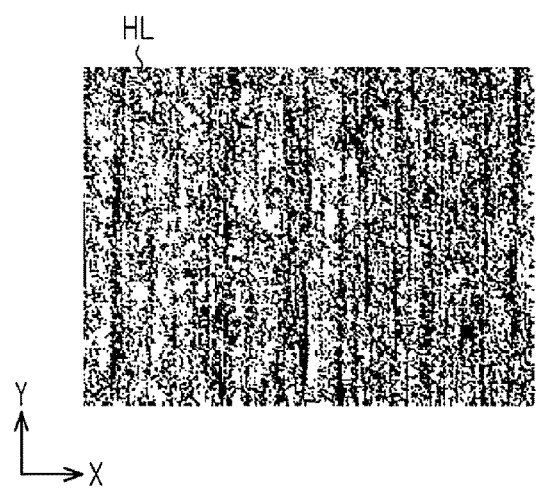
FIG. 22 is a plan view showing an example of structures formed by hairline finish.
Figure 23:
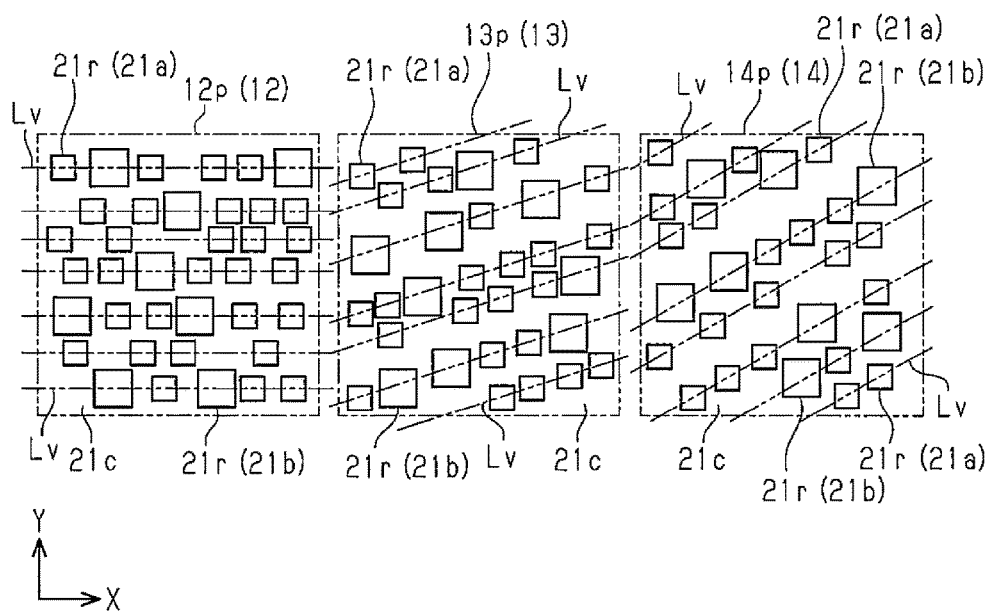
FIG. 23 is a plan view showing the planar structures of display portions as viewed facing the reflection surface.

Referring to FIGS. 21 to 23, structure of the display 10 is now described.

FIG. 21 is an enlarged view showing an example of one of the display portions 12p forming the first display region 12. The display portion 12p is a part of the first display region 12. FIG. 21 shows planar structure in a plan view facing the reflection surface 21s.

As shown in FIG. 21, in a plan view facing the reflection surface 21s, the rectangular surfaces 21r in a display portion 12p of the first display region 12 are substantially square in shape, and the third reflection surface 21c occupies gaps between adjacent ones of the rectangular surfaces 21r.

In a plan view facing the reflection surface 21s, a plurality of rectangular surfaces 21r is located on each imaginary line Lv. That is, a plurality of rectangular surfaces 21r is arranged on each imaginary line Lv. The imaginary lines Lv extend in a first extending direction, which intersects X direction, and imaginary lines Lv are arranged in a first arrangement direction which is perpendicular to the first extending direction. The imaginary lines Lv are arranged in the first arrangement direction so as to limit emission of diffracted light that is perceivable by the naked eye.

For some of the imaginary lines Lv, all the rectangular surfaces 21r located on the imaginary lines Lv are first reflection surfaces 21a. For the other imaginary lines Lv, the rectangular surfaces 21r located on the imaginary lines Lv include first reflection surfaces 21a and second reflection surfaces 21b.

The plurality of imaginary lines Lv may include an imaginary line Lv on which all the rectangular surfaces 21r are second reflection surfaces 21b. Further, the plurality of imaginary lines Lv does not have to include an imaginary line Lv on which both first reflection surfaces 21a and second reflection surfaces 21b are located. In other words, on each imaginary line Lv, either a plurality of first reflection surfaces 21a only or a plurality of second reflection surfaces 21b only may be located.

Nevertheless, in order to facilitate mixing of the first color light emitted in accordance with the first inter-reflection-surface distance DR1 and the second color light emitted in accordance with the second inter-reflection-surface distance DR2, the plurality of imaginary lines Lv preferably includes an imaginary line Lv on which both first reflection surfaces 21a and second reflection surfaces 21b are located.

In the plurality of imaginary lines Lv, an inter-imaginary-line distance DL1, which is the distance between two imaginary lines Lv that are adjacent to each other in the first arrangement direction, varies irregularly with respect to the order of arrangement of the imaginary lines Lv. In other words, the imaginary lines Lv are arranged in the first arrangement direction in a random manner, and the imaginary lines Lv are parallel to one another. That is, in a plan view facing the reflection surface 21s, the inter-imaginary-line distances DL1 have different extents and vary irregularly with respect to the order of arrangement of the imaginary lines Lv on a straight line Ls intersecting imaginary lines Lv.

The inter-imaginary-line distances DL1 of the imaginary lines Lv are preferably between 0.3 μm and 2 μm inclusive, for example. A smaller inter-imaginary-line distance DL1 increases the range of angles at which light beams are emitted in the direction perpendicular to the extending direction of the imaginary lines Lv. This enlarges the region from which the observer of the display 10 can see the emitted light. In contrast, a larger inter-imaginary-line distance DL1 reduces the range of angles at which light beams are emitted in the direction perpendicular to the extending direction of the imaginary lines Lv. This reduces the size of the region from which the observer of the display 10 can see the emitted light.

On each imaginary line Lv, a plurality of rectangular surfaces 21r is arranged in a random manner. Thus, the distances between adjacent ones of the rectangular surfaces 21r arranged along one imaginary line Lv are not uniform values. The structure in which a plurality of rectangular surfaces 21r is arranged in a random manner on each imaginary line Lv is advantageous in that the structure reduce emission of diffracted light in the extending direction of the imaginary lines Lv, which would otherwise occur according to periodicity of the rectangular surfaces 21r.

In the present embodiment, each imaginary line Lv differs from the other imaginary lines Lv in the positions of the rectangular surfaces 21r on the imaginary line Lv. However, as long as rectangular surfaces 21r are arranged in a random manner on each imaginary line Lv, each imaginary line Lv may be identical to the other imaginary lines Lv in the positions of the rectangular surfaces 21r on the imaginary line Lv.

In addition, rectangular surfaces 21r may be arranged regularly on each imaginary line Lv. That is, rectangular surfaces 21r may be arranged with a fixed periodicity. This structure still allows the display portion 12p to emit the third color light produced by mixing the first color light, which is produced in accordance with the first inter-reflection-surface distance DR1, and the second color light, which is produced in accordance with the second inter-reflection-surface distance DR2.

Since a plurality of rectangular surfaces 21r is arranged along each imaginary line Lv, the plurality of rectangular surfaces 21r arranged along one imaginary line Lv functions like a structure formed on a surface of a metal layer by hairline finish, for example. Thus, the display portion 12p emits light in the direction perpendicular to the extending direction of the imaginary lines Lv but hardly emits colored light in the extending direction of the imaginary lines Lv.

The rectangular surfaces 21r that are arranged along one imaginary line Lv and the third reflection surface 21c that occupies gaps between adjacent ones of the rectangular surfaces 21r on that imaginary line Lv function as a pseudo surface 21d extending along the imaginary line Lv. Consequently, the third color light that is produced by the pseudo surfaces 21d and the third reflection surface 21c located between adjacent pseudo surfaces 21d is emitted in the direction perpendicular to the imaginary lines Lv.

In other words, among the directions in which light is emitted from the display portion 12p, direction that is perpendicular to the direction in which the intensity of emitting light is maximized is the extending direction of the imaginary lines Lv in the display portion 12p. Therefore, the extending direction of the imaginary lines Lv in the display portion 12p can be identified by the direction in which light is emitted from the display portion 12p.

FIG. 22 shows structures HL that are formed in a surface of a metal layer by typical hairline finish. As shown in FIG. 22, the metal layer after hairline finish includes a plurality of linear structures extending in the Y direction. The structures are arranged at irregular intervals in a direction that intersects the Y direction. Heights of the structures have different extents. Thus, the structures formed by hairline finish do not function to reduce the diffraction efficiency of light of a specific wavelength. When white light enter on the metal layer having hairline finish, the metal layer emits white scattered light in the X direction, which is perpendicular to the Y direction.

FIG. 23 shows an example of one display portion of each of the first display region 12, the second display region 13, and the third display region 14. These portions are parts of the display regions. In FIG. 23, for purpose of illustration, the display portions of the display regions are arranged in one direction.

FIG. 23 shows the planar structures as viewed facing the reflection surface 21s. For purpose of illustration, the reflection layer 21 is not shown in FIG. 23, in a similar manner as FIG. 21. The covered surface 23s is described below as the reflection surface 21s for purpose of illustration.

As shown in FIG. 23, in a plan view facing the reflection surface 21s, the display portion 12p of the first display region 12 includes a plurality of imaginary lines Lv extending in the X direction. The imaginary lines Lv are arranged in the Y direction in a random manner.

On each imaginary line Lv, a plurality of rectangular surfaces 21r is arranged in a random manner. However, the rectangular surfaces 21r may be arranged on each imaginary line Lv with a fixed periodicity.

In a plan view facing the reflection surface 21s, the display portion 13p of the second display region 13 includes a plurality of imaginary lines Lv in a similar manner as the display portion 12p of the first display region 12. In the display portion 13p, the imaginary lines Lv extend in the second extending direction, which intersects the X direction, and the direction of orientation, which is the extending direction of the imaginary lines Lv, differs from that in the display portion 12p of the first display region 12. The imaginary lines Lv are arranged random in a second arrangement direction which is perpendicular to the second extending direction.

On each imaginary line Lv, a plurality of rectangular surfaces 21r is arranged in a random manner. However, the rectangular surfaces 21r may be arranged on each imaginary line Lv with a fixed periodicity.

In a plan view facing the reflection surface 21s, the display portion 14p of the third display region 14 includes a plurality of imaginary lines Lv in a similar manner as the display portion 12p of the first display region 12. The imaginary lines Lv extend in the third extending direction, which intersects the X direction, and the angle formed by the X direction and the third extending direction is greater than the angle formed by the X direction and the second extending direction. In the display portion 14p, the direction of orientation, which is the extending direction of the imaginary lines Lv, differs from both of the direction of orientation in the first display region 12 and the direction of orientation in the second display region 13. The angle formed by the X direction and the third extending direction may be smaller than the angle formed by the X direction and the second extending direction. The imaginary lines Lv are arranged in a third arrangement direction, which is perpendicular to the third extending direction, in a random manner.

On each imaginary line Lv, a plurality of rectangular surfaces 21r is arranged in a random manner. However, the rectangular surfaces 21r may be arranged on each imaginary line Lv with a fixed periodicity.

The first display region 12, the second display region 13, and the third display region 14 differ from one another in the extending direction of the imaginary lines Lv. Accordingly, the first display region 12, the second display region 13, and the third display region 14 differ from one another in the directivity of emitted light.

The first display region 12, the second display region 13, and the third display region 14 differ from one another in the extending direction of the imaginary lines Lv. However, at least two of the three display regions may be identical in the extending direction of the imaginary lines Lv.

Each display region is equal to the other display regions in the first inter-reflection-surface distance DR1, and each display region is equal to the other display regions in the second inter-reflection-surface distance DR2. Accordingly, the first display region 12, the second display region 13, and the third display region 14 emit light of same color.

[Operation of Display]

Figure 24:
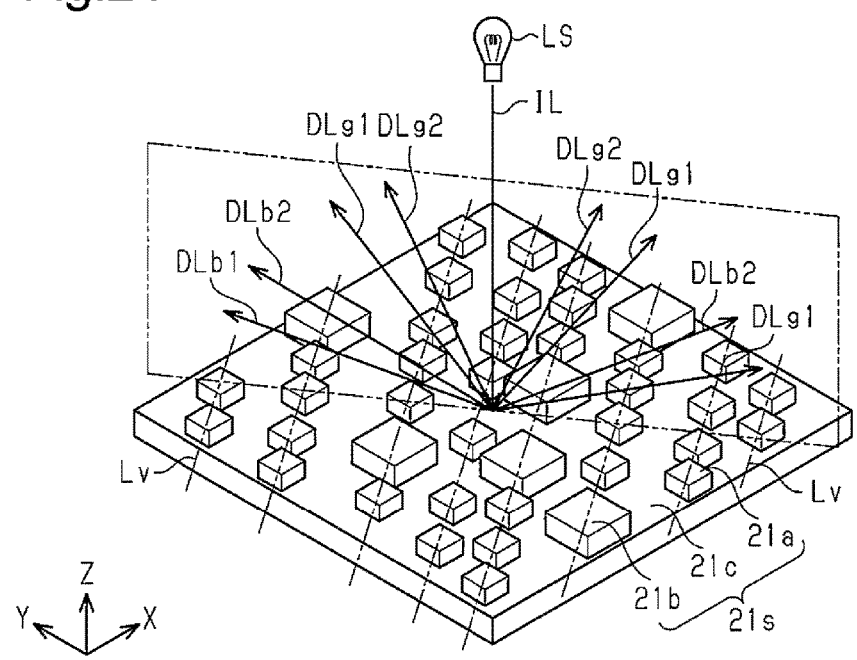
FIG. 24 is a diagram for illustrating the operation of the display portion.

Referring to FIG. 24, the operation of the display 10 is now described. FIG. 24 is a perspective view showing an example of a display portion 12p including a plurality of first reflection surfaces 21a, a plurality of second reflection surfaces 21b, and a third reflection surface 21c.

In FIG. 24, for purpose of illustration, the reflection layer 21 is shown as a structure formed by a plurality of first protrusions, each having a first reflection surface 21a as a top surface, a plurality of second protrusions each having a second reflection surface 21b as a top surface, and a layer including the third reflection surface 21c as one surface on which the first protrusions and the second protrusions are located.

In addition, for purpose of illustration, white illumination light IL that is emitted toward the reflection surface 21s is described below as having only a red light component, a green light component, and a blue light component, in a similar manner as the first embodiment. However, the illumination light IL actually includes components of other colors.

As shown in FIG. 24, when the illumination light IL emitted by the light source LS enter on the reflection surface 21s, the reflection surface 21s emits first blue light DLb1 having a wavelength of 460 nm and first green light DLg1 having a wavelength of 540 nm in accordance with the first inter-reflection-surface distance DR1, in a similar manner as the first embodiment. Consequently, the light emitted from the reflection surface 21s includes light of a cyan color, which is the first color.

In addition, when the illumination light IL emitted by the light source LS enter on the reflection surface 21s, the reflection surface 21s emits second blue light DLb2 having a wavelength of 510 nm and second green light DLg2 having a wavelength of 590 nm in accordance with the second inter-reflection-surface distance DR2, in a similar manner as the first embodiment. Consequently, the light emitted from the reflection surface 21s includes light of a cyan color that is closer to green than the first color. This color is the second color, which differs from the first color.

In the reflection surface 21s, rectangular surfaces 21r are arranged on imaginary lines Lv extending in the first extending direction. Thus, the rectangular surfaces 21r that are arranged on one imaginary line Lv and the third reflection surface 21c that occupies gaps between adjacent ones of the rectangular surfaces 21r on that imaginary line Lv function as a pseudo surface 21d. The pseudo surfaces 21d arranged in the first arrangement direction and the third reflection surface 21c located between adjacent pseudo surfaces 21d form a structure that causes the reflection surface 21s to emit light in the first arrangement direction, which is perpendicular to the first extending direction in which the pseudo surfaces 21d extend.

As a result, the reflection surface 21s emits the first blue light DLb1, the first green light DLg1, the second blue light DLb2, and the second green light DLg2 in a plane that extends in the first arrangement direction and the Z direction on the reflection surface 21s.

In structure in which a plurality of rectangular surfaces 21r is arranged along each imaginary line Lv, the third color light has directivity and is emitted in the direction substantially perpendicular to the extending direction of the imaginary lines Lv in a plan view facing the reflection surface 21s. Accordingly, the display 10 emits light of a specific color and displays an image that changes dynamically as compared to a structure that emits light isotropically.

The second embodiment of a display, an article, an original plate, and a method for producing an original plate has following advantages in addition to advantages (1), (2), and (4) to (7).

(11) Since a plurality of rectangular surfaces 21r is arranged on each imaginary line Lv, the rectangular surfaces 21r on one imaginary line Lv and the sections of the third reflection surface 21c located between adjacent ones of the rectangular surfaces 21r in a plan view facing the reflection surface 21s may be considered as forming one pseudo surface 21d. Thus, the interference between the reflection light from the rectangular surfaces 21r arranged on the imaginary lines and the reflection light from the third reflection surface 21c located between the imaginary lines Lv produces colored light. The colored light has directivity and is emitted in the direction substantially perpendicular to the extending direction of the imaginary lines in a plan view facing the obverse surface of the reflection layer. Accordingly, the display 10 emits light of a specific color and displays an image that changes dynamically as compared to a structure that emits light isotropically.

Modifications of Second Embodiment

The above-described second embodiment may be modified as follows.

Not all the display portions 12p in the first display region 12 have to be identical in the extending direction of the imaginary lines Lv. The structure described above with reference to FIG. 23 has the first display region 12, the second display region 13, and the third display region 14 that differ from one another in the extending direction of the Imaginary lines Lv. In addition, each display region may include display portions that differ from one another in the extending direction of the imaginary lines Lv.

Specifically, in each of the display portions in each display region, the imaginary lines Lv are parallel to each other within the display portion. In addition, for two display portions adjacent to each other, an angle between imaginary lines, which is the angle formed by the extending direction of the imaginary lines Lv in one of the display portions, which is an example of the first display portion, and the extending direction of the imaginary lines Lv in the other display portion, which is an example of the second display portion, is preferably less than or equal to 10°.

This configuration has following advantage.

(12) The angle between imaginary lines for two display portions adjacent to each other is less than or equal to 10°. Therefore, the brightness of two adjacent display portions change successively as the angle formed by the extending direction of the imaginary lines and the viewing direction of the observer changes.

In a display portion 12*p*, a plurality of imaginary lines Lv may extend radially from a starting portion set in the display portion 12*p*. When the starting portion is a point and all the imaginary lines Lv extend from the same starting point, the plurality of imaginary lines Lv may form the shape of a sector or a circle. In such a structure, on a straight line intersecting imaginary lines Lv, the inter-imaginary-line distances have different extents, in a similar manner as the second embodiment. The angle formed by two adjacent ones of the imaginary lines Lv is set to be less than or equal to 10°, for example, and is preferably a few degrees.

In such a structure, as the angle formed by the extending direction of imaginary lines Lv and the viewing direction of the observer changes, the part of the display portion 12*p* that is perceived as having a relatively high brightness and the part that is perceived as having a relatively low brightness change successively.

In a structure in which a plurality of imaginary lines Lv extends radially from a starting portion, the starting portion may be a region having a certain area. In this case, the imaginary lines Lv share the starting portion but do not have to extend from the same starting point. In such a structure, the plurality of imaginary lines Lv may form a ring shape or an arcuate shape in one display.

A plurality of display portions 12*p* may include at least two of a display portion 12*p* in which a plurality of rectangular surfaces 21*r* is arranged in a random manner, a display portion including imaginary lines Lv that are parallel to one another, and a display portion including a plurality of imaginary lines Lv that extends radially.

The color of the light emitted from each display region may differ from the colors of the light emitted from the other display regions. That is, each display region may differ from the other display regions in at least one of the first inter-reflection-surface distance DR1 and the second inter-reflection-surface distance DR2.

Further, the display 10 may include a plurality of display region groups, each including at least one display region. The display regions in one display region group may emit light of the color, and the display regions in each display region group may emit light of a color that differs from the colors of the light emitted by the display regions in the other display region groups.

The invention claimed is:

1. A display comprising:

a substrate including a covered surface; and a reflection layer covering at least part of the covered surface, wherein an obverse surface of the reflection layer includes a plurality of first reflection surfaces, a plurality of second reflection surfaces, and a third reflection surface, in a plan view facing the obverse surface of the reflection layer, the first reflection surfaces and the second reflection surfaces are rectangular surfaces, which are square in shape, and the third reflection surface occupies gaps between adjacent ones of the rectangular surfaces, a distance between the first reflection surfaces and the third reflection surface in a thickness direction of the substrate is a distance that enables the obverse surface of the reflection layer to reflect light of a first color by interference between light reflected from the first reflection surfaces and light reflected from the third reflection surface, a distance between the second reflection surfaces and the third reflection surface in the thickness direction of the substrate is a distance that enables the obverse surface of the reflection layer to reflect light of a second color, which differs from the first color, by interference between light reflected from the second reflection surfaces and light reflected from the third reflection surface, and the obverse surface of the reflection layer reflects light of a third color that includes the light of the first color and the light of the second color, in a plan view facing the obverse surface of the reflection layer, a length of one side of each first reflection surface is a first length, and the first length of each first reflection surface is equal to the first length of the other first reflection surfaces, in a plan view facing the obverse surface of the reflection layer, a length of one side of each second reflection surface is a second length, and the second length of each second reflection surface is equal to the second length of the other second reflection surfaces, the first length differs from the second length, in the thickness direction of the substrate, the distance between the first reflection surfaces and the third reflection surface is different than the distance between the second reflection surfaces and the third reflection surface, and the first length is smaller than the second length.

2. The display according to claim 1, wherein, in a plan view facing the obverse surface of the reflection layer, each rectangular surface is separated from the other rectangular surfaces, and the rectangular surfaces are located in the obverse surface of the reflection layer in a random manner.

3. The display according to claim 1, wherein, in a plan view facing the obverse surface of the reflection layer, each rectangular surface is separated from the other rectangular surfaces, and more than one of the rectangular surfaces are arranged along each of a plurality of imaginary lines, and on a straight line intersecting more than one of the imaginary lines, distances between adjacent ones of the imaginary lines have different extents.

4. The display according to claim 3, wherein
the obverse surface of the reflection layer includes
- a first display portion including more than one of the first reflection surfaces and more than one of the second reflection surfaces, and
- a second display portion including more than one of the first reflection surfaces and more than one of the second reflection surfaces, more than one of the imaginary lines are set in each of the first display portion and the second display portion, wherein the imaginary lines are parallel to one another in each of the first display portion and the second display portion, a direction in which the imaginary lines extend in the first display portion is a first direction, a direction in which the imaginary lines extend in the second display portion is a second direction, which differs from the first direction, and the first direction and the second direction form an angle of less than or equal to 10°.

5. The display according to claim 1, wherein,
in a plan view facing the obverse surface of the reflection layer, the obverse surface of the reflection layer includes
a first region in which at least one of the first reflection surfaces is located,
a second region in which at least one of the second reflection surfaces is located, and
a third region in which at least one of the first reflection surfaces and at least one of the second reflection surfaces are located.

6. The display according to claim 1, wherein
an area of the obverse surface of the reflection layer that is occupied by all the first reflection surfaces is a first reflection area,
an area of the obverse surface of the reflection layer that is occupied by all the rectangular surfaces is a rectangular area,
the rectangular area is between 15% and 50% inclusive of a total area of the obverse surface of the reflection layer, and
the first reflection area is greater than or equal to 70% and less than 100% of the rectangular area.

7. The display according to claim 1, wherein
the obverse surface of the reflection layer includes
- a third display portion including more than one of the first reflection surfaces, more than one of the second reflection surfaces, and the third reflection surface, and
- a fourth display portion including more than one of the first reflection surfaces, more than one of the second reflection surfaces, and the third reflection surface, in each of the third display portion and the fourth display portion,
an area occupied by all the first reflection surfaces is a first unit area,
an area occupied by all the second reflection surfaces is a second unit area,
an area occupied by all the rectangular surfaces is a third unit area, and
a percentage of the second unit area to the third unit area is a second reflection surface ratio, the first unit area in the third display portion is substantially equal to the first unit area in the fourth display portion, and the second reflection surface ratio in the third display portion and the second reflection surface ratio in the fourth display portion are greater than or equal to 1% and less than 30%.

8. The display according to claim 1, wherein, in the thickness direction of the substrate, a distance between the first reflection surfaces and the second reflection surfaces is between 0.02 µm and 0.1 µm inclusive.

9. The display according to claim 1, wherein, in the thickness direction of the substrate, a distance between the first reflection surfaces and the second reflection surfaces is between 0.2 µm and 0.45 µm inclusive.

10. The display according to claim 1, wherein the obverse surface of the reflection layer includes at least one of a diffraction portion that diffracts light incident on the obverse surface of the reflection layer, an anti-reflection portion that limits reflection of light incident on the obverse surface of the reflection layer, and a light scattering portion that scatters light incident on the obverse surface of the reflection layer.

11. An article comprising:
a display; and
a support portion that supports the display, wherein the display is the display according to claim 1.

* * * * *